US012807146B2

(12) United States Patent
Ezoe

(10) Patent No.: US 12,807,146 B2
(45) Date of Patent: Nov. 24, 2026

(54) MOVEMENT CONTROL SYSTEM, MOVEMENT CONTROL METHOD, MOVEMENT CONTROL DEVICE, AND INFORMATION PROCESSING DEVICE

(71) Applicant: SONY GROUP CORPORATION, Tokyo (JP)

(72) Inventor: Rikuya Ezoe, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 152 days.

(21) Appl. No.: 18/687,430

(22) PCT Filed: Feb. 25, 2022

(86) PCT No.: PCT/JP2022/007820

§ 371 (c)(1),
(2) Date: Feb. 28, 2024

(87) PCT Pub. No.: WO2023/042424

PCT Pub. Date: Mar. 23, 2023

(65) Prior Publication Data

US 2024/0367648 A1 Nov. 7, 2024

(30) Foreign Application Priority Data

Sep. 17, 2021 (JP) ................................ 2021-152229

(51) Int. Cl.

*B60W 30/095* (2012.01)
*B60W 30/09* (2012.01)
*B60W 60/00* (2020.01)
*G05D 1/622* (2024.01)
*B60W 50/04* (2006.01)
*B60W 50/06* (2006.01)

(52) U.S. Cl.

CPC ........ *B60W 30/0956* (2013.01); *B60W 30/09* (2013.01); *B60W 60/001* (2020.02); (Continued)

(58) Field of Classification Search

CPC ............ B60W 30/0956; B60W 30/09; B60W 60/001; B60W 2050/046;
(Continued)

(56) References Cited

U.S. PATENT DOCUMENTS 7,484,008 B1 * 1/2009 Gelvin .................. G06F 15/173 709/249
9,855,950 B2 * 1/2018 Tezuka .................. B60W 30/16
(Continued)

FOREIGN PATENT DOCUMENTS

EP 4242999 A1 9/2023
JP 2010-017428 A 1/2010
(Continued)

OTHER PUBLICATIONS

International Search Report and Written Opinion of PCT Application No. PCT/JP2022/007820, issued on Apr. 26, 2022, 11 pages of ISRWO.

*Primary Examiner* — David P. Merlino
(74) *Attorney, Agent, or Firm* — CHIP LAW GROUP

(57) ABSTRACT

Provided is a movement control system that includes a first processing unit and a second processing unit that communicate with each other, in which the first processing unit generates route information used to control a movement route of a mobile device using sensor information acquired from the second processing unit, on the basis of non-real-time processing with no constraint of a response time required for processing, and the second processing unit controls movement of the mobile device along the route information generated by the first processing unit, on the basis of real-time processing with a constraint of the response time required for the processing.

12 Claims, 21 Drawing Sheets

(52) U.S. Cl.
CPC ....... *G05D 1/622* (2024.01); *B60W 2050/046* (2013.01); *B60W 2050/065* (2013.01); *B60W 2552/53* (2020.02); *B60W 2554/4045* (2020.02); *B60W 2555/60* (2020.02); *B60W 2556/45* (2020.02)

(58) Field of Classification Search
CPC ....... B60W 2050/065; B60W 2552/53; B60W 2554/4045; B60W 2555/60; B60W 2556/45; B60W 2420/403; B60W 2420/408; G05D 1/622; G05D 1/242; G05D 2101/22; G05D 2105/22; G05D 2107/13; G05D 2109/10; G08G 1/0112; G08G 1/09623; G08G 1/096725; G08G 1/096822; G08G 1/164; G08G 1/166
See application file for complete search history.

(56) References Cited

U.S. PATENT DOCUMENTS

| | | | | |
|---|---|---|---|---|
| 2015/0185021 | A1* | 7/2015 | Oh | G01S 17/06<br>701/522 |
| 2019/0286151 | A1* | 9/2019 | Palanisamy | G08G 1/096816 |
| 2019/0383950 | A1* | 12/2019 | Bagheri | G01S 13/867 |
| 2020/0101974 | A1* | 4/2020 | Ha | H04W 4/024 |
| 2020/0269864 | A1* | 8/2020 | Zhang | G08G 1/165 |
| 2020/0276984 | A1 | 9/2020 | Matsumoto | |
| 2021/0116907 | A1 | 4/2021 | Altman | |
| 2021/0165108 | A1* | 6/2021 | Heinonen | G01S 19/40 |
| 2021/0201264 | A1* | 7/2021 | Galliano, III | G06Q 10/08 |
| 2021/0237722 | A1 | 8/2021 | Suzuki | |
| 2021/0323573 | A1* | 10/2021 | Gogna | G01C 21/3407 |
| 2021/0374573 | A1* | 12/2021 | Lambrecht | G06F 9/54 |
| 2023/0305138 | A1* | 9/2023 | Zhou | H04J 3/0638 |
| 2023/0406332 | A1* | 12/2023 | Hasegawa | B60W 50/023 |

FOREIGN PATENT DOCUMENTS

| | | | |
|---|---|---|---|
| JP | 2010-262477 | A | 11/2010 |
| JP | 2019-174304 | A | 10/2019 |
| JP | 2020-77372 | A | 5/2020 |
| JP | 2021-064213 | A | 4/2021 |
| WO | 2016/194134 | A1 | 12/2016 |
| WO | 2019/026139 | A1 | 2/2019 |
| WO | 2021/172492 | A1 | 9/2021 |

* cited by examiner

FIG.4

171

| TIME STAMP | SELF POSITION (INTERNAL SENSOR) | SELF POSITION (NON REAL TIME) | COR-RECTED SELF POSITION | INTERNAL SENSOR DATA | FIRST SENSOR DATA | SECOND SENSOR DATA |
|---|---|---|---|---|---|---|
| T0 | (SP0, T0) | (EP0, T0) | (AP0, T0) | (IS0, T0) | (ES0, T0) | (DS0, T0) |
| T1 | (SP1, T1) | (EP1, T1) | (AP1, T1) | (IS1, T1) | (ES1, T1) | (DS1, T1) |
| T2 | (SP2, T2) | (EP2, T2) | (AP2, T2) | (IS2, T2) | (ES2, T2) | (DS2, T2) |
| T3 | (SP3, T3) | (EP3, T3) | (AP3, T3) | (IS3, T3) | (ES3, T3) | (DS3, T3) |
| T4 | (SP4, T4) | (EP4, T4) | (AP4, T4) | (IS4, T4) | (ES4, T4) | (DS4, T4) |
| T5 | (SP5, T5) | (EP5, T5) | (AP5, T5) | (IS5, T5) | (ES5, T5) | (DS5, T5) |

FIG.5

172

| ROUTE INFORMATION | | | | | | | |
|---|---|---|---|---|---|---|---|
| ROUTE | TARGET TIME | TARGET POSITION | TARGET POSTURE | TARGET SPEED | TARGET ACCELER-ATION | TARGET ANGULAR SPEED | TARGET ANGULAR ACCELER-ATION |
| R100 | T100 | OP100 | OPS100 | OV100 | OA100 | OAV100 | OAA100 |
| | T102 | OP102 | OPS102 | OV102 | OA102 | OAV102 | OAA102 |
| | T104 | OP104 | OPS104 | OV104 | OA104 | OAV104 | OAA104 |
| | T106 | OP106 | OPS106 | OV106 | OA106 | OAV106 | OAA106 |
| | T108 | OP108 | OPS108 | OV108 | OA108 | OAV108 | OAA108 |
| R110 | T110 | OP110 | OPS110 | OV110 | OA110 | OAV110 | OAA110 |

FIG.7

231

| TIME STAMP | FIRST SENSOR DATA | | | | |
|---|---|---|---|---|---|
| | CAMERA | RADAR | LiDAR | ULTRASONIC SENSOR | GPS |
| T0 | (I0, T0) | (D0, T0) | (L0, T0) | (U0, T0) | (G0, T0) |
| T1 | (I1, T1) | (D1, T1) | (L1, T1) | (U1, T1) | (G1, T1) |
| T2 | (I2, T2) | (D2, T2) | (L2, T2) | (U2, T2) | (G2, T2) |
| T3 | (I3, T3) | (D3, T3) | (L3, T3) | (U3, T3) | (G3, T3) |
| T4 | (I4, T4) | (D4, T4) | (L4, T4) | (U4, T4) | (G4, T4) |
| T5 | (I5, T5) | (D5, T5) | (L5, T5) | (U5, T5) | (G5, T5) |

FIG.8

232

| ROUTE INFORMATION | | | | | | | |
|---|---|---|---|---|---|---|---|
| ROUTE | TARGET TIME | TARGET POSITION | TARGET POSTURE | TARGET SPEED | TARGET ACCELER-ATION | TARGET ANGULAR SPEED | TARGET ANGULAR ACCELER-ATION |
| R200 | T200 | OP200 | OPS200 | OV200 | OA200 | OAV200 | OAA200 |
| | T202 | OP202 | OPS202 | OV202 | OA202 | OAV202 | OAA202 |
| | T204 | OP204 | OPS204 | OV204 | OA204 | OAV204 | OAA204 |
| | T206 | OP206 | OPS206 | OV206 | OA206 | OAV206 | OAA206 |
| | T208 | OP208 | OPS208 | OV208 | OA208 | OAV208 | OAA208 |
| R210 | T210 | OP210 | OPS210 | OV210 | OA210 | OAV210 | OAA210 |

MOVEMENT CONTROL SYSTEM, MOVEMENT CONTROL METHOD, MOVEMENT CONTROL DEVICE, AND INFORMATION PROCESSING DEVICE

CROSS REFERENCE TO RELATED APPLICATIONS

This application is a U.S. National Phase of International Patent Application No. PCT/JP2022/007820 filed on Feb. 25, 2022, which claims priority benefit of Japanese Patent Application No. JP 2021-152229 filed in the Japan Patent Office on Sep. 17, 2021. Each of the above-referenced applications is hereby incorporated herein by reference in its entirety.

FIELD

The present disclosure relates to a movement control system, a movement control method, a movement control device, and an information processing device. More particularly, the present disclosure relates to a movement control technology used for automated driving of a mobile device or advanced driver-assistance systems (ADAS).

BACKGROUND

As a technology related to a mobile device such as an automobile, a technology has been known that performs autonomous travel of the mobile device, by generating a route of the mobile device and controlling the mobile device to travel following the route, by a processor or the like.

Regarding such an automated driving technology, a technology has been known that controls an accelerator, a brake, a steering, or the like, on the basis of a traveling route determined using map information acquired from a database and information acquired from a sensor mounted on a vehicle (for example, Patent Literature 1).

CITATION LIST

Patent Literature

Patent Literature 1: WO 2016/194134 A

SUMMARY

Technical Problem

According to the related art, it is possible to perform movement control of a mobile device such as route generation and route following control with high accuracy. Here, from the viewpoint of safety, it is required to perform highly-responsive movement control, in addition to enabling to perform the movement control with high accuracy. However, in a case where such movement control is performed with high accuracy, a processing load generally increases, and responsiveness is deteriorated. On the other hand, if the processing load is suppressed to be low and the responsiveness is emphasized, the accuracy of the movement control decreases, and as a result, the safety is impaired. In this way, the related art has problems in achieving both of the high accuracy and the high responsiveness of the movement control required to perform the movement control with high safety.

Therefore, in the present disclosure, a movement control system, a movement control method, a movement control device, and an information processing device that realize movement control with high accuracy and with high responsiveness are proposed.

Solution to Problem

In order to solve the above problems, A movement control system according to an embodiment of the present disclosure includes a first processing unit and a second processing unit configured to communicate with each other, wherein the first processing unit generates route information used to control a movement route of a mobile device using sensor information acquired from the second processing unit, on the basis of non-real-time processing with no constraint of a response time required for processing, and the second processing unit controls movement of the mobile device along the route information generated by the first processing unit, on the basis of real-time processing with a constraint of the response time required for the processing.

BRIEF DESCRIPTION OF DRAWINGS

FIG. 4 is a diagram illustrating an example of a database of the real-time processing device according to the embodiment.

FIG. 5 is a diagram illustrating an example of the database of the real-time processing device according to the embodiment.

FIG. 7 is a diagram illustrating an example of a database of the non-real-time processing device according to the embodiment.

FIG. 8 is a diagram illustrating an example of the database of the non-real-time processing device according to the embodiment.

DESCRIPTION OF EMBODIMENTS

Figure 1:
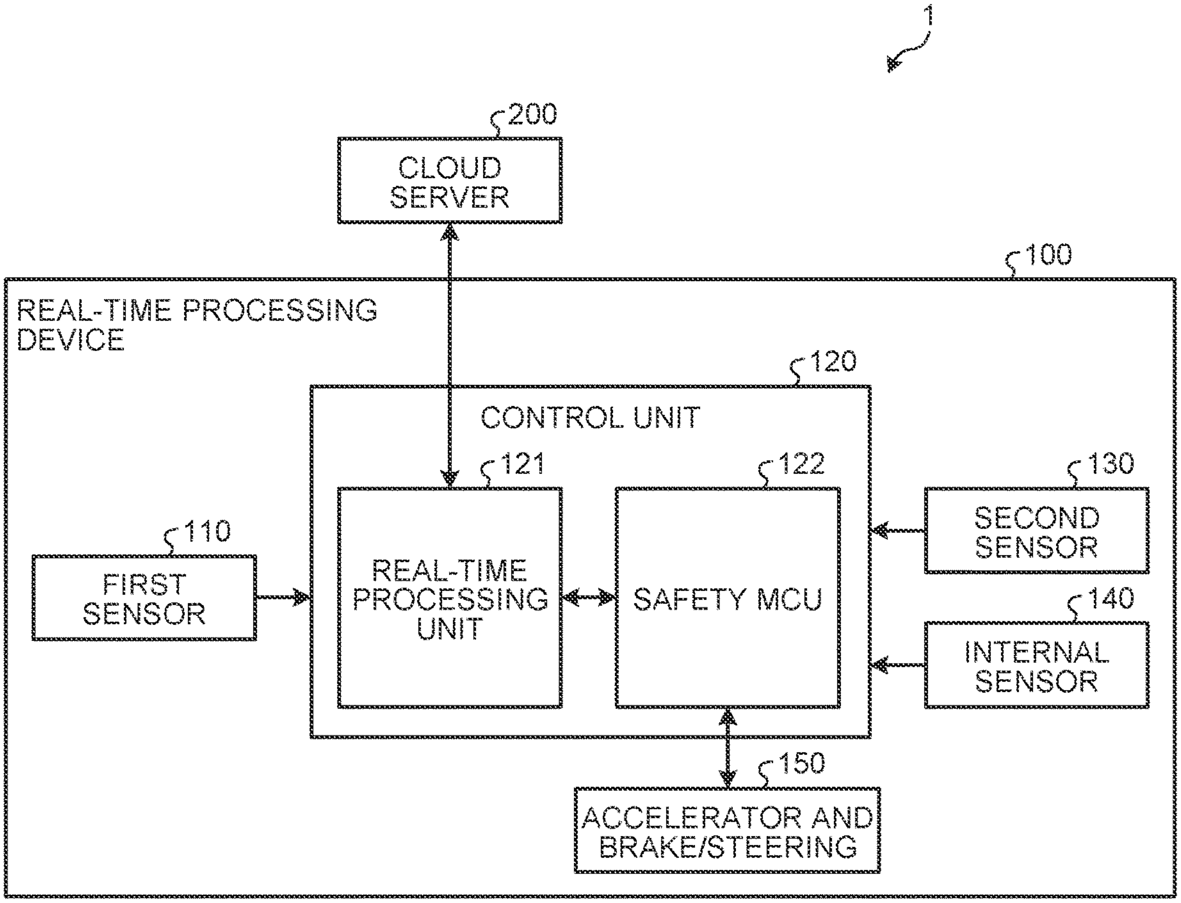
FIG. 1 is a diagram illustrating an outline of a movement control system according to an embodiment.

Hereinafter, an embodiment of the present disclosure will be described in detail with reference to the drawings. Note that, in each embodiment below, the same component is denoted with the same reference numeral so as to omit redundant description.

The present disclosure will be described according to the following order of items.

1. Embodiment
1-1. Configuration of Movement Control System According to Embodiment
1-2. Example of Movement Control According to Embodiment
1-3. Procedure of Movement Control According to Embodiment
1-4. Modification According to Embodiment
2. Other Embodiments
2-1. Configuration of Mobile Device
2-2. Others
3. Effects of Movement Control System According to Present Disclosure
4. Hardware Configuration

1. Embodiment

1-1. Configuration of Movement Control System According to Embodiment

FIG. 1 is a diagram illustrating a configuration of a movement control system 1 according to an embodiment of the present disclosure. Specifically, in FIG. 1, a diagram illustrating an outline of a real-time processing device 100 and a non-real-time processing device included in the movement control system according to the present disclosure is illustrated.

Movement control according to the embodiment of the present disclosure is applied to a case where a predetermined mobile device that performs automated driving determines a global route on the basis of a destination set by a user of the mobile device and map information acquired from a database and performs movement control following a local movement route of the mobile device on the basis of the global route and information around the mobile device acquired from a sensor or the like. Here, the global route refers to a general route from a travel start point of the mobile device to a destination. The local movement route indicates a specific movement route such as selection of a specific road and lane, traveling on the center of the lane or traveling on the end of the road, regarding the global route. Hereinafter, the movement route indicating a local movement route, and the route information indicates information indicating the movement route. The mobile device according to the embodiment includes a bicycle, a bike, a cargo transport vehicle, a robot, or the like, in addition to an automobile. However, in the embodiment, an automobile is exemplified as an example of the mobile device, and the movement control of the mobile device will be described. Furthermore, in the embodiment, the real-time processing device 100 indicates the mobile device itself or a movement control device included in the mobile device. Furthermore, in the embodiment, the non-real-time processing device will be described using a cloud server 200 existing outside of the real-time processing device 100 as an example. The movement control according the embodiment is performed by the real-time processing device 100 and the non-real-time processing device.

In general, when performing autonomous movement control, an automobile determines a route on the basis of the set destination and the map information, and performs the movement control following the determined route while recognizing surrounding objects, a road shape, or the like. As an example, the movement control for following the determined route is realized by performing the following control. Information such as an accelerator position, a transmission vehicle speed, or a steering angle, determined by a control unit such as a processor is transmitted to each electronic control unit (ECU) such as an engine transmission control ECU, a brake control ECU, or a power steering control ECU, through in-vehicle communication such as a controller area network (CAN). Then, the respective ECUs, for performing engine transmission control, brake control, and power steering control, control an engine transmission, brake, and steering. Processing executed by each ECU that performs the engine transmission control, the brake control, and the power steering control is referred to as real-time processing or actual-time processing, and is processing on which a response time is guaranteed and in which correctness of a processing result depends on a time when the result is output, in addition to correctness of an output result value. In other words, the real-time processing and the actual-time processing indicate a processing method that is designed to set a deadline or an allowable range of a delay time from reception of an input of a processing command to an output of a processing result and not to exceed the deadline or the allowable time. In this way, in the real-time processing and the actual-time processing, by imposing a constraint to a required time before the processing is completed and output is made, highly-responsive processing can be executed. The automobile can perform control such as braking without a delay, through the real-time processing with a constraint of a response time. In the mobile device such as the automobile, since a control delay may cause a serious accident, the control of the brake, the accelerator, or the like needs to be performed through the real-time processing that is the processing of which the response time is guaranteed. In particular, in a case of a situation where the automobile requires a sudden stop, before the automobile actually stops from a brake operation, a series of controls including situation determination that requires brake control, transmission of a control command to the brake, and start of brake processing are performed. However, in any one of the controls, occurrence of a delay largely impairs safety.

By the way, even if the response time is guaranteed for each ECU that performs the engine transmission control, the brake control, and the power steering control, it is not always possible to execute processing of which safety is ideally ensured. For example, the engine transmission control, the brake control, and the power steering control may be performed by real-time processing of which the response time is guaranteed, and the determination and transmission of the information such as the accelerator position, the transmission vehicle speed, or the steering angle may be performed under control without guaranteeing the response time. In this case, regarding the determination and the transmission of the information that is a premise of the control such as the engine transmission control, the brake control, or the power steering control, processing can be executed with high accuracy by not imposing the constraint that is guarantee of the response time. However, there is a possibility that a delay occurs in the series of controls, and there is a possibility that the safety is not ensured as a result.

In order to avoid deterioration in the safety due to such control delay, the entire movement control system may be constructed by the real-time processing with the constraint of guaranteeing the response time. However, in a case where the entire movement control system is constructed by the real-time processing with the constraint of guaranteeing the response time, accuracy of the processing may be deteriorated by requesting the guarantee of the response time over the series of entire control. Therefore, there is a possibility that the safety is not ensured as a result.

Therefore, the movement control system 1 according to the present disclosure solves the above problems, by processing described below. The movement control system 1 includes the real-time processing device 100 that executes the real-time processing with the constraint of the response time required for the processing and the cloud server 200 that executes the non-real-time processing with no constraint of the response time required for the processing. The cloud server 200 is an example of an information processing device and generates route information used to control a movement route of the mobile device. The real-time processing device 100 is an example of a movement control device and controls movement of the mobile device according to the generated route information.

The cloud server 200 can generate the movement route with high accuracy, by generating the route information by the non-real-time processing with no constraint of the response time required for the processing. On the other hand, the real-time processing device 100 can perform highly-responsive route following control, by the real-time processing with the constraint of the response time required for the processing. That is, while the movement control system 1 imposes the constraint of guaranteeing the response time, regarding the control of the brake or the accelerator and the determination and the transmission of the information which is a premise for the control, the movement control system 1 does not impose the constraint of guaranteeing the response time, regarding the generation of the route information which is a premise of these. With such a configuration, the movement control system 1 can perform movement control of which the safety is ensured. Note that, in addition, about the generation of the route information, the cloud server 200 generates next route information, in a predetermined time or distance before the real-time processing device 100 reaches an end point of a movement route on which the real-time processing device 100 is traveling. Therefore, even if the route information is generated with a slight delay by not imposing the constraint of guaranteeing the response time, a delay does not occur in the series of movement control.

Hereinafter, an outline of the movement control system 1 according to the embodiment and an example of the movement control will be described with reference to FIGS. 1 and 2. Note that, in the following description, it is assumed that the real-time processing device 100 included in the movement control system 1 be mounted on an automobile that is the mobile device or an automobile itself function as the real-time processing device 100. That is, in the following description, the real-time processing device 100 can be read as the automobile (mobile device).

In the example illustrated in FIG. 1, it is assumed that the movement control system 1 include the real-time processing device 100 and the cloud server 200. The real-time processing device 100 includes a first sensor 110, a control unit 120, a second sensor 130, an internal sensor 140, and an accelerator and brake/steering 150.

The first sensor 110 is a sensor that acquires information regarding a mobile device or around the mobile device and is referred to as a High-End Sensor or the like. The information acquired by the first sensor is used for processing such as the generation of the route information by the cloud server 200. The information acquired by the first sensor may be transmitted to the cloud server 200, via communication such as the Ethernet or WiFi. As a specific example of the first sensor 110, a camera, a light detection and ranging (LiDAR), a millimeter-wave radar, an ultrasonic sensor, a global positioning system (GPS), and the like are exemplified. A specific example of the information acquired by the first sensor 110 will be described later in detail with reference to FIG. 7.

The second sensor 130 is a sensor that acquires information regarding the mobile device or around the mobile device and is a sensor that acquires second sensor information used for processing such as object detection or emergency braking performed by a safety MCU 122. The second sensor 130 is referred to as a Safety Sensor or the like. The second sensor 130 transmits the acquired information to the safety MCU 122 via CAN communication or the like. As a specific example of the second sensor 130, a camera, a light detection and ranging (LiDAR), a millimeter-wave radar, an ultrasonic sensor, and the like are exemplified.

The internal sensor 140 is a sensor that acquires information regarding a behavior of the mobile device that is internal sensor information used for self-position estimation (dead reckoning) by a real-time processing unit 121. As a specific example of the internal sensor 140, an inertial measurement unit (IMU) (acceleration sensor, angular velocity sensor), a vehicle speed (wheel) encoder, and the like are exemplified.

The control unit 120 is a processor that executes the real-time processing such as movement control for following the route information or emergency braking. The control unit 120 is implemented by executing a program (for example, movement control program according to the present disclosure) stored in the control unit 120, for example, by a central processing unit (CPU), a micro processing unit (MPU), or a graphics processing unit (GPU) using a random access memory (RAM) or the like as a work area.

Furthermore, the control unit 120 is a controller (controller), and for example, may be implemented by an integrated circuit such as an application specific integrated circuit (ASIC) or a field programmable gate array (FPGA).

The control unit 120 further includes the real-time processing unit 121 and the safety MCU 122 and implements or executes functions and actions of the movement control to be described below. Note that an internal configuration of the control unit 120 is not limited to the configuration illustrated in FIG. 1, and may be another configuration as long as the configuration performs the movement control to be described later.

The real-time processing unit 121 receives sensor information from the first sensor 110 and the internal sensor 140, gives a time stamp to first sensor information and internal sensor information, and transmits the information to the cloud server 200. The real-time processing unit 121 is referred to as a Realtime Unit or the like, for example. Furthermore, a position of the real-time processing device 100 is estimated on the basis of the internal sensor information. Moreover, the real-time processing unit 121 receives a position recognition result of the real-time processing device 100 and the route information from the cloud server 200 and corrects the position estimation of the real-time processing device 100 and performs travel control following the route information.

The safety MCU 122 receives the second sensor information from the second sensor 130 and performs object detection, emergency control, or the like on the route, on the basis of the second sensor information.

The accelerator and brake/steering 150 performs travel control of the real-time processing device 100 such as an accelerator, a brake, or a steering, on the basis of control information such as an accelerator position or a steering angle received from the safety MCU 122 and the real-time processing unit 121. The accelerator and brake/steering 150 includes an accelerator control ECU, the brake control ECU, and the steering control ECU that actually control hardware modules of the accelerator and the brake, and the steering, in addition to the hardware modules of the accelerator and the brake, and the steering. Furthermore, instead of each ECU, a single ECU that controls all the hardware modules of the accelerator and the brake, and the steering may be provided.

The cloud server 200 is a device that executes the non-real-time processing with no constraint of guaranteeing the response time. The cloud server 200 generates the route information of the movement route of the real-time processing device 100, recognizes the position of the real-time processing device 100, and recognizes an object on the route of the movement route of the real-time processing device 100. Furthermore, all the processing related to the movement control, other than the processing particularly executed by the real-time processing device 100, may be executed by the cloud server 200. In the movement control system 1, components other than the cloud server 200 execute the processing with a guarantee that is the constraint of the response time, while the cloud server 200 executes the processing with no constraint of guaranteeing the response time.

Next, an outline of movement control processing executed by the movement control system 1 will be described, with reference to FIG. 2. FIG. 2 is a block diagram illustrating the movement control processing of the movement control system 1 executed by the real-time processing device 100 and the cloud server 200. In FIG. 2, a flow of the movement control processing executed by the movement control system 1 is illustrated as a schematic block diagram.

Figure 2:
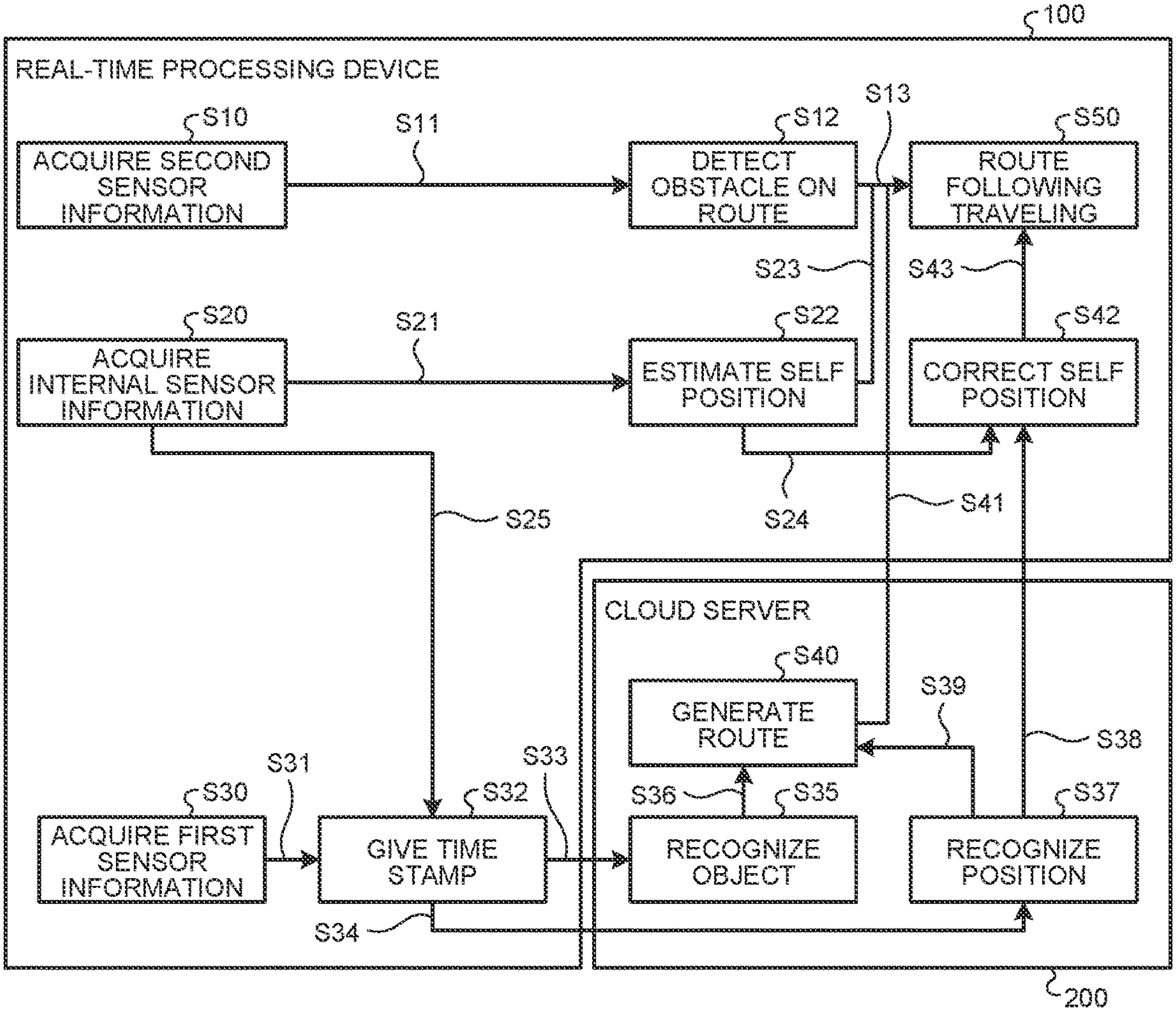
FIG. 2 is a diagram for explaining movement control according to the embodiment.

In the example illustrated in FIG. 2, first, the real-time processing device 100 acquires the second sensor information from the second sensor 130 (Step S10). The real-time processing device 100 outputs the second sensor information of the second sensor 130 (Step S11). Next, the real-time processing device 100 detects an obstacle on the route of the movement route of the real-time processing device 100, on the basis of the second sensor information of the second sensor 130 (Step S12). Then, the real-time processing device 100 outputs information regarding the detected obstacle so as to make the real-time processing device 100 travel following the movement route (Step S13). Note that, an example of the obstacle detected by the real-time processing device 100 in Step S12 may be another mobile device, a pedestrian, a moving object such as an animal, a static object such as garbage or waste on a route, and a traffic sign such as a signal and a sign. Furthermore, the detection includes not only to simply detect presence of an object but also processing for recognizing meaning information such as to detect that the object is a pedestrian who is passing through a crosswalk or that the object is a sign indicating that a speed limit is 50 Km/h.

Furthermore, the real-time processing device 100 acquires the sensor information from the internal sensor information (Step S20). The real-time processing device 100 outputs the acquired internal sensor information to be used for self-position estimation (Step S21). Next, the real-time processing device 100 estimates the position of the real-time processing device 100, using the acquired internal sensor information (Step S22). Then, the real-time processing device 100 outputs the estimated position of the real-time processing device 100 to be used to make the real-time processing device 100 travel following the movement route (Step S23). Furthermore, the real-time processing device 100 outputs the estimated position of the real-time processing device 100 to be corrected, on the basis of the position recognition of the real-time processing device 100 by the cloud server 200 to be described later (Step S24). Moreover, the real-time processing device 100 outputs the acquired internal sensor information so as to give a time stamp (Step S25).

Furthermore, the real-time processing device 100 acquires the first sensor information from the first sensor (Step S30). The real-time processing device 100 outputs the acquired first sensor information so as to give the time stamp (Step S31).

Next, the real-time processing device 100 gives the time stamp to the internal sensor information and the first sensor information (Step S32). Here, the time stamp is information indicating a time stamp when the sensor information is acquired. The real-time processing device 100 transmits the first sensor information to which the time stamp is given to the cloud server 200 so as to perform object recognition by the cloud server 200 (Step S33). Furthermore, the real-time processing device 100 transmits the internal sensor information and the first sensor information to which the time stamp is given, so as to recognize the position of the real-time processing device 100 by the cloud server 200 (Step S34).

Next, the cloud server 200 performs object recognition (Step S35). Then, the result of the object recognition is output to generate a route (Step S36).

Next, the cloud server 200 recognizes the position of the real-time processing device 100, on the basis of the first sensor information and the internal sensor information to which the time stamp is given (Step S37). Here, the position recognition is to recognize the position of the mobile device by the cloud server 200. Unlike the self-position estimation for estimating a relative position change of the mobile device by the mobile device, in the position recognition, an absolute position of the mobile device is recognized by using the first sensor information to which the time stamp is given. Note that, since the position of the mobile device to be recognized is a position of the mobile device at the time of the given time stamp, the position is a past position of the mobile device at the time when the position recognition is completed.

Next, the cloud server 200 transmits the result of the position recognition to the real-time processing device 100 so as to correct the position estimation by the real-time processing device 100 (Step S38). Furthermore, the cloud server 200 outputs the result of the position recognition to generate a route (Step S39).

Next, the cloud server 200 generates the route information of the movement route of the real-time processing device 100, on the basis of the result of the object recognition and the result of the position recognition of the real-time processing device 100 (Step S40). Then, the cloud server 200 transmits the route information of the movement route to the real-time processing device 100 (Step S41). Here, the generation of the route information is to generate route information connected to a route on which the mobile device is currently traveling. Furthermore, the generation of the route information is not limited to generate the route connected to the route on which the mobile device is currently traveling, and to create a next route in advance may be the route generation in Step S35. The route information includes information such as a target position, posture, speed, acceleration, angular speed, or angular acceleration of the mobile device at a certain time.

Next, the real-time processing device 100 corrects the estimated position, on the basis of the result of the position estimation by the real-time processing device 100 and the result of the position recognition by the cloud server 200 (Step S42). Then, the real-time processing device 100 outputs a result of the corrected position estimation (Step S43). Since position information of the mobile device recognized by the cloud server 200 is the position of the mobile device at the time of the given time stamp, the correction of the position estimation is correction of a result of position estimation at the time when the time stamp is given. Since the position estimation based on the sensor information of the internal sensor 140 in Step S22 is position estimation based on a relative position change, errors are accumulated due to its nature. For example, in a case of self-position estimation of the internal sensor that causes an error of 10 cm in a traveling direction of the mobile device each time when the mobile device travels one km, an error of one m is caused by traveling 10 km. Therefore, the real-time processing device 100 can correct the accumulated errors by correcting the result of the past position estimation using absolute position information recognized by the cloud server 200 and can perform more accurate position estimation. Note that, as a supplement, for such correction of self position, it is desirable that the position recognition of the mobile device by the cloud server 200 is more accurate than the position estimation by the mobile device itself. Therefore, in the embodiment, the cloud server 200 that can execute processing with high accuracy with no constraint of guaranteeing the response time performs such position recognition.

Next, the real-time processing device 100 performs travel control following the movement route, on the basis of the result of the obstacle detection on the route of the movement route by the real-time processing device 100 and the corrected result of the position estimation, and the route information of the movement route by the cloud server 200 (Step S50).

As described above, in the movement control system 1, the real-time processing device 100 executes the processing and control that require guarantee of the response time, such as the position estimation, the obstacle detection on the route, the correction of the position estimation result, the route following traveling with respect to the movement route. On the other hand, the cloud server 200 executes processing, for which responsiveness is not important, requiring high accuracy, such as the generation of the route information of the movement route or the recognition of the position of the mobile device at a certain past time point. In this way, the movement control system 1 can achieve both of the high accuracy of the processing and control of the mobile device and the high responsiveness, by sharing and executing the processing and the control of the mobile device by devices having different properties. Therefore, the movement control system 1 can perform movement control with high safety.

Figure 3:
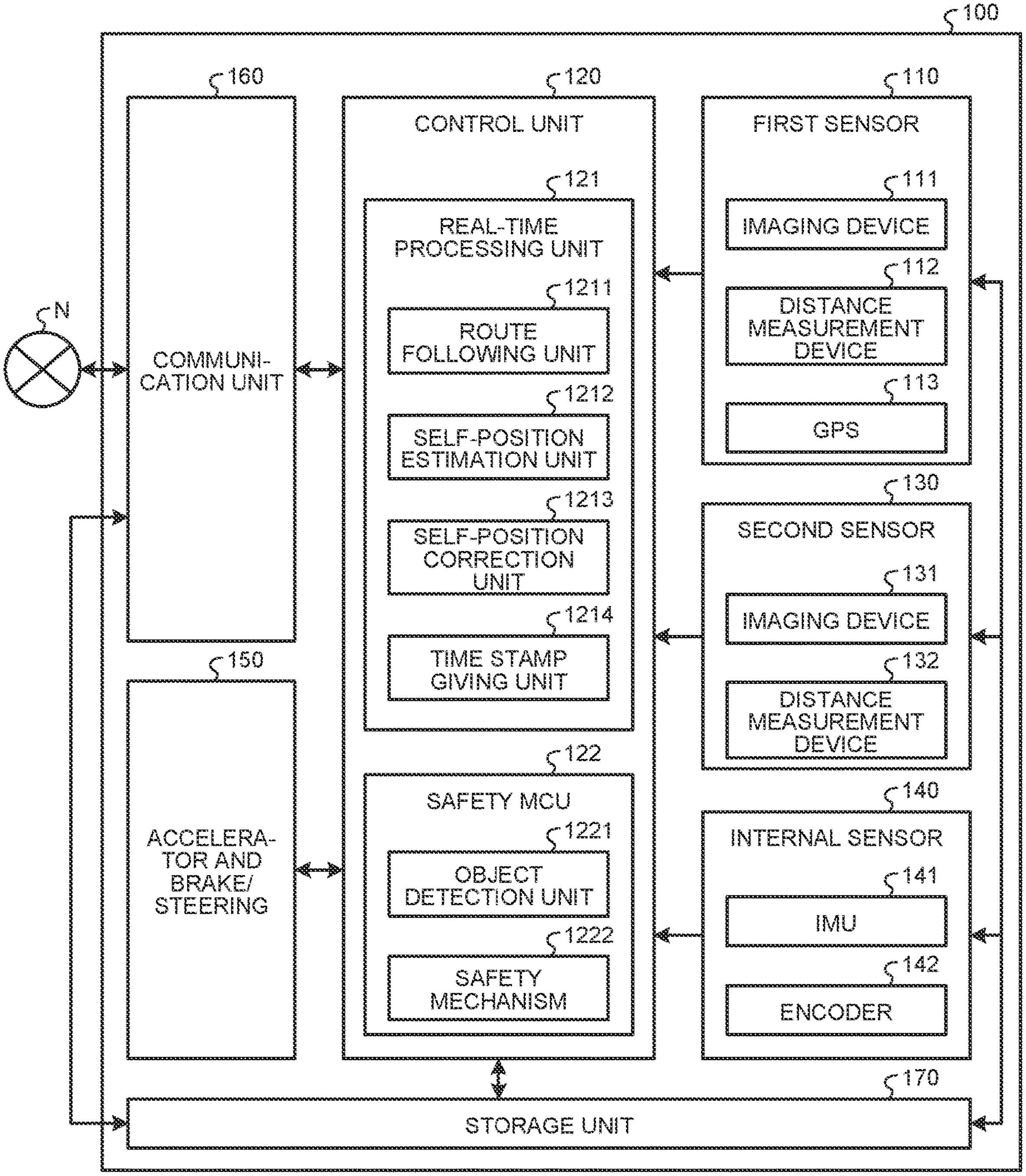
FIG. 3 is a diagram illustrating a configuration example of a real-time processing device according to the embodiment.

Next, an internal configuration of the real-time processing device 100 will be described with reference to FIG. 3. FIG. 3 is a diagram illustrating a configuration example of the real-time processing device 100 according to the embodiment. In FIG. 3, a block diagram of the real-time processing device 100 is illustrated. The real-time processing device 100 further includes a communication unit 160 and a storage unit 170, in addition to the first sensor 110, the control unit 120, the second sensor 130, the internal sensor 140, and the accelerator and brake/steering 150 illustrated in FIG. 2. Processing executed by each unit of the real-time processing device 100 is the real-time processing with the constraint of guaranteeing the response time. However, of the processing executed by each unit of the real-time processing device 100, a part of the processing may be the non-real-time processing with no constraint of guaranteeing the response time.

The communication unit 160 communicates between the real-time processing device 100 and a network and transmits and receives predetermined information.

The storage unit 170 stores data such as the sensor information to which the time stamp is given. The data stored in the storage unit 170 is sensor information supplied from a sensor included in the real-time processing device 100 such as the first sensor 110 and information supplied from the cloud server 200 via the communication unit 160. Furthermore, the data stored in the storage unit 170 is appropriately output and used by the control unit 120 or the like and is output to and used by the cloud server 200 via the communication unit 160.

The control unit 120 includes the real-time processing unit 121 and the safety MCU 122. The real-time processing unit 121 includes a route following unit 1211, a self-position estimation unit 1212, a self-position correction unit 1213, and a time stamp giving unit 1214.

The route following unit 1211 executes processing for the real-time processing device 100 to perform route following traveling, on the basis of the route information generated by the cloud server 200.

The self-position estimation unit 1212 performs self-position estimation on the basis of the internal sensor information that is sensor information regarding a behavior of the real-time processing device 100 acquired from the internal sensor 140. The behavior of the real-time processing device 100 included in the internal sensor information is a moving distance or a moving speed acquired by a wheel encoder, information regarding an acceleration based on the IMU, or the like. The self-position estimation unit 1212 measures a relative moving speed, moving direction, or the like of the real-time processing device 100 according to the internal sensor information, and estimates the position of the real-time processing device 100.

The self-position correction unit 1213 corrects the position of the real-time processing device 100 estimated by the self-position estimation unit 1212, using the recognition result of the position of the real-time processing device 100 acquired from the cloud server 200 via the communication unit. The cloud server 200 recognizes the position of the real-time processing device 100 on the basis of the first sensor information and the internal sensor information and the time stamps of these pieces of sensor information.

Therefore, the recognition result of the position of the real-time processing device 100 by the cloud server 200 is a result at the time when the time stamp is given. Therefore, the position of the real-time processing device 100 corrected by the self-position correction unit 1213 is also a position of the real-time processing device 100 at the time when the time stamp is given. Such correction of the position of the real-time processing device 100 performed by the self-position correction unit 1213 may be referred to as re-estimation of the position of the real-time processing device 100. Furthermore, the route following unit 1211 may execute processing for performing route following traveling, further using a result of the position re-estimation.

The time stamp giving unit 1214 gives a time stamp at a time when the sensor information is acquired, to the first sensor information and the internal sensor information acquired from the first sensor 110. By giving the time stamp to the sensor information by the time stamp giving unit 1214, more accurate processing can be executed by referring to the given time stamp, for example, when the cloud server 200 executes processing using the sensor information. Note that the time stamp may also be given to the second sensor information.

The safety MCU 122 includes an object detection unit 1221 and a safety mechanism 1222. The safety MCU 122 executes processing that particularly requires safety and urgency, among the processing executed by the real-time processing device 100.

The object detection unit 1221 detects an object that exists in a detection range of the second sensor, such as on or near the route where the mobile device travels, using the second sensor information acquired from the second sensor. The object detection performed by the object detection unit 1221 includes not only to simply perceive the existence of the object but also recognition processing such as understanding of a type and context of the object or action prediction. For example, the object detection unit 1221 perceives existence of a person and predicts a subsequent action from that the person is a pedestrian and is about to cross a crosswalk and a moving history in past several seconds (moving direction and acceleration). In addition, recognition and prediction of a lighting color of a traffic light, road sign recognition, white line recognition, recognition of a moving object such as a bicycle, action prediction, or the like are included.

The safety mechanism 1222 performs emergency control of the mobile device, emergency avoidance, and emergency control such as a re-planning instruction of the movement route to the cloud server 200, at the time of emergency or the like. The emergency control performed by the safety mechanism 1222 is performed on the basis of information such as a traveling speed of the real-time processing device 100, the type of the object detected by the object detection unit 1221 using the second sensor information, or the distance from the real-time processing device 100 to the object. A case where the safety mechanism 1222 performs the emergency control of the mobile device is a case where the generation of the route by the cloud server 200 is delayed, a case where an object exists on the traveling route of the real-time processing device 100, or the like. As an example of the emergency control of the safety mechanism 1222, emergency control for causing the real-time processing device 100 to stop on the traveling route or near the traveling route is exemplified.

Examples of a database included in the storage unit 170 are illustrated in FIGS. 4 and 5. A database 171 in FIG. 4 is a database indicating a correspondence between a time stamp indicating a time when the sensor information is acquired and each piece of the sensor information to which the time stamp is given and a result of the self-position estimation based on each piece of the sensor information. Note that, since the second sensor information is mainly used by the real-time processing device 100, it is not essential to give the time stamp. Furthermore, for convenience of description, in FIG. 4, it is assumed that timings of acquiring the pieces of sensor information including the first sensor, the second sensor, the internal sensor be unified. However, the timings of acquiring the pieces of sensor information of the respective sensors are different as long as the timings are not synchronized. Therefore, different time stamps are usually given. Furthermore, as described above, the first sensor, the second sensor, and the internal sensor include a plurality of sensors such as cameras or millimeter-wave radars. Here, for convenience of description, the plurality of sensors is collectively described as the first sensor, the second sensor, and the internal sensor. Moreover, for example, in a case where the first sensor includes a camera and a millimeter-wave radar, as long as timings of sensor information acquisition of the camera and the millimeter-wave radar are not synchronized, different time stamps are given to sensor information of the camera and sensor information of the millimeter-wave radar.

When giving a time stamp indicating a time when sensor information is given to the sensor information of each sensor, the real-time processing device 100 transmits the time stamp to the cloud server 200. The cloud server 200 refers to the time stamp and executes various types of processing such as position recognition of the mobile device based on the sensor information, at the time when the sensor information is acquired. In a case where the cloud server 200 executes various types of processing based on the sensor information, in a case where a time stamp is not given to the sensor information, a temporal error occurs in the processing such that the current self position is recognized on the basis of the past sensor information. In a case where the time stamp is given, it is possible to recognize a self position at the past time when the time stamp is given. Therefore, a temporal error does not occur in the processing.

A database 172 in FIG. 5 is the route information generated by the cloud server 200 stored in the storage unit 170. The route information defines a target time for each route, and includes some or all pieces of information such as a target position, posture, speed, acceleration, angular speed, and angular acceleration at the target time. In a case where all the pieces of information are included in the route information, precise route following can be performed. However, it is necessary to refer to a large amount of information. Since the route following is performed by the real-time processing device 100 with the constraint of guaranteeing the response time as described above, there may be a case where it is difficult to perform control while referring to a large amount of information within the constraint. In such a case, for example, only the target position, time, posture, and speed may be referred, among the information included in the route information. Furthermore, each piece of information may be weighted and referred, while referring to all the pieces of information.

Furthermore, in the database 172 illustrated in FIG. 5, five target times T100 to T108 and target positions OP100 to OP108 corresponding to the respective target times, or the like are set for a single piece of route information R100. Note that, although the cloud server 200 sets the plurality of target times and the target positions or the like corresponding to the target times for the single piece of route information, the number of target times set for the single route, the target positions corresponding to the target times are not limited to those in the example illustrated in FIG. 5. Note that processing on the cloud server 200 side for generating the route information will be described later. In this way, the storage unit 170 stores the route information generated by the cloud server 200 as the database 172.

Figure 6:
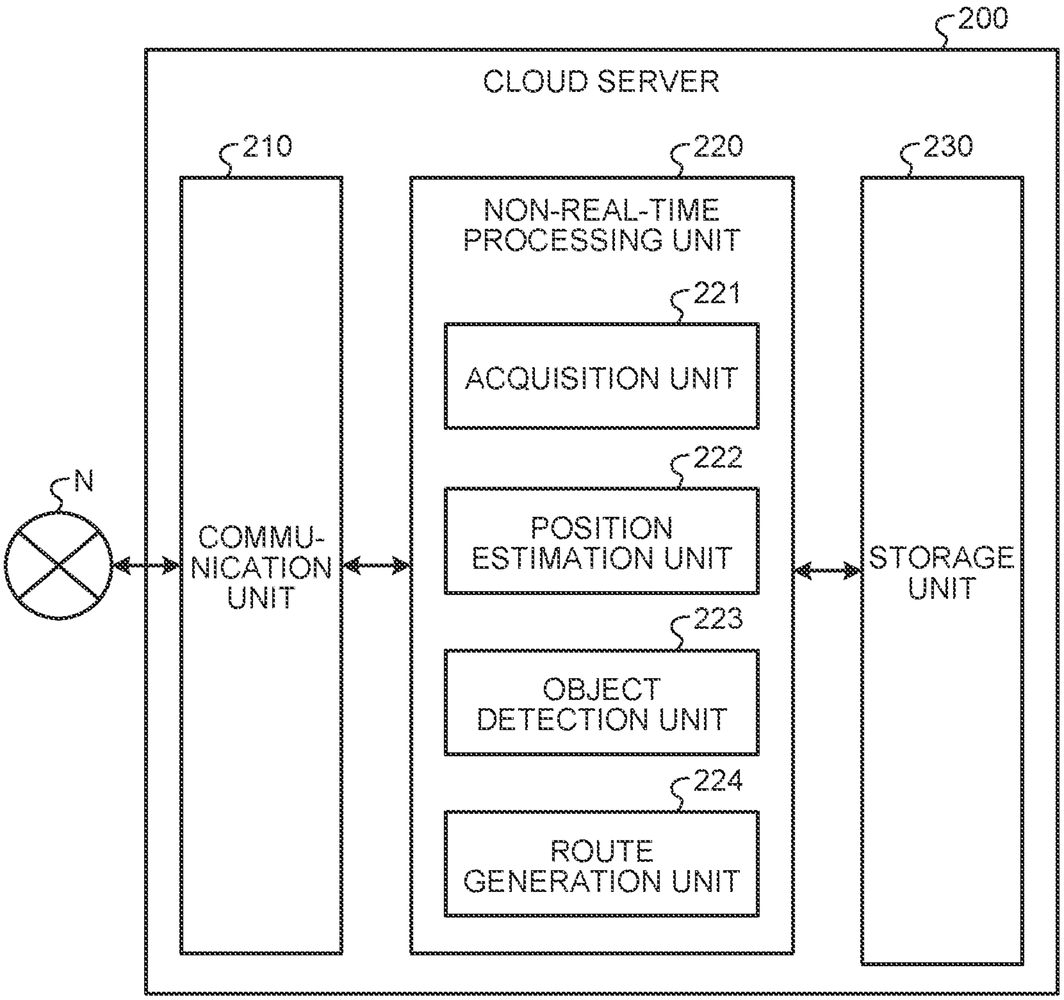
FIG. 6 is a diagram illustrating a configuration example of a non-real-time processing device according to the embodiment.

Next, an internal configuration of the cloud server 200 will be described with reference to FIG. 6. FIG. 6 is a diagram illustrating a configuration example of the non-real-time processing device (cloud server 200) according to the embodiment. In FIG. 6, a block diagram of the cloud server 200 is illustrated. The cloud server 200 includes a communication unit 210, a non-real-time processing unit 220, and a storage unit 230.

The communication unit communicates between the cloud server 200 and the network and transmits and receives various types of information therebetween.

The non-real-time processing unit 220 executes the processing of the cloud server 200 and includes an acquisition unit 221, a position recognition unit 222, an object detection unit 223, and a route generation unit 224. Processing executed by the non-real-time processing is the non-real-time processing with no constraint of guaranteeing the response time, and the processing is executed on the basis of various types of sensor information acquired from the real-time processing device 100 and the time stamp given to the sensor information.

The storage unit 230 stores the sensor information acquired from the real-time processing device 100 and stores the generated route information.

The acquisition unit 221 acquires various types of sensor information from the real-time processing device 100, via the communication unit 210.

The position recognition unit 222 recognizes the position of the real-time processing device 100 on the basis of the sensor information of the first sensor 110 and the sensor information of the internal sensor 140 acquired by the acquisition unit 221, and the time stamp given to each piece of the sensor information. Therefore, the recognition result of the position of the real-time processing device 100 by the position recognition unit 222 is a result with higher accuracy than a result of the position estimation by the real-time processing device 100 estimated by the real-time processing on the basis of only the internal sensor information. Furthermore, the recognition result of the position of the real-time processing device 100 by the position recognition unit 222 is a past position of the real-time processing device 100 that is a time when the time stamp is given. The sensor information of the first sensor 110 is referred to as the sensor information of the internal sensor 140.

The object detection unit 223 detects an obstacle that exists in a detectable range of the first sensor 110 such as on or near the route where the mobile device travels, on the basis of the first sensor information acquired by the acquisition unit 221.

An example of the obstacle may be another mobile device, a pedestrian, a moving object such as an animal, a static object such as garbage or waste on a route, and a traffic sign such as a signal and a sign. Furthermore, the detection by the object detection unit 223 includes not only to simply detect the object but also recognition processing such as understanding of the type or context of the object or action prediction. For example, the detection includes processing for recognizing meaning information such that the detected object is a pedestrian who is passing through a crosswalk or that the object is a sign indicating that a speed limit is 50 Km/h. Furthermore, the object detection includes processing for predicting a subsequent action from that the person is a pedestrian and is about to cross a crosswalk or a moving history (moving direction and acceleration) in past several seconds. Furthermore, in addition, the object detection includes recognition and prediction of a lighting color of a traffic light, road sign recognition, white line recognition, recognition of a moving object such as a bicycle, action prediction, or the like. Note that the object detection by the object detection unit 223 is performed by the non-real-time processing with no constraint of guaranteeing the response time, on the basis of the information of the first sensor 110. Therefore, more accurate object detection can be performed as compared with the processing of the object detection unit 1221 executed by the real-time processing.

The route generation unit 224 generates the route information, on the basis of the position of the real-time processing device 100 recognized by the position recognition unit 222 and the information regarding the object detected by the object detection unit 223. The route information generated by the route generation unit 224 sets the plurality of target times, the target positions corresponding to those, or the like for the single piece of the route information. However, the number of target times set for the single route, the target position corresponding to that, or the like are appropriately set. For example, the route generation unit 224 may set a single target time, a target position corresponding to that, or the like or may set 100 target times, target positions corresponding to those, or the like, for a single piece of route information. For example, in a case where the cloud server 200 generates route information on a highway, a route width is wide, and the number of curves is small. Therefore, a length of the single piece of route information may be one km, and five target times, target positions corresponding to those, or the like may be determined for the route. On the other hand, in a case where route information for passing through a tollgate on the highway is generated, the route generation unit 224 may set the length of the single piece of route information to 100 m, and determine 20 target times, target positions corresponding to those, or the like for the route. Furthermore, the route generation unit 224 may generate a plurality of pieces of route information once, and if next route information of the route where the real-time processing device 100 is traveling has already been generated, the route generation unit 224 may further generate a next route.

FIG. 7 illustrates a database 231, which is an example of a database included in the storage unit 230, that is the information of the first sensor acquired from the first sensor 110. A time stamp corresponding to a time when the sensor information is acquired is given to the information of the first sensor included in the database 231. For example, the position recognition unit 222 refers to the sensor information of the first sensor 110 and the sensor information (not illustrated) of the internal sensor 140 stored in the storage unit 230 and the time stamp given to each sensor and recognizes the position of the mobile device.

FIG. 8 illustrates a database 232, which is an example of the database included in the storage unit 230, that is the route generated by the route generation unit 224. After the route generation unit 224 has generated the route information, the storage unit 230 stores the route information in the database. The route information defines the target time for each route as described above, and includes some or all pieces of the information such as the target position, posture, speed, acceleration, angular speed, and angular acceleration at the target time.

1-2. Example of Movement Control According to Embodiment

Figure 9:
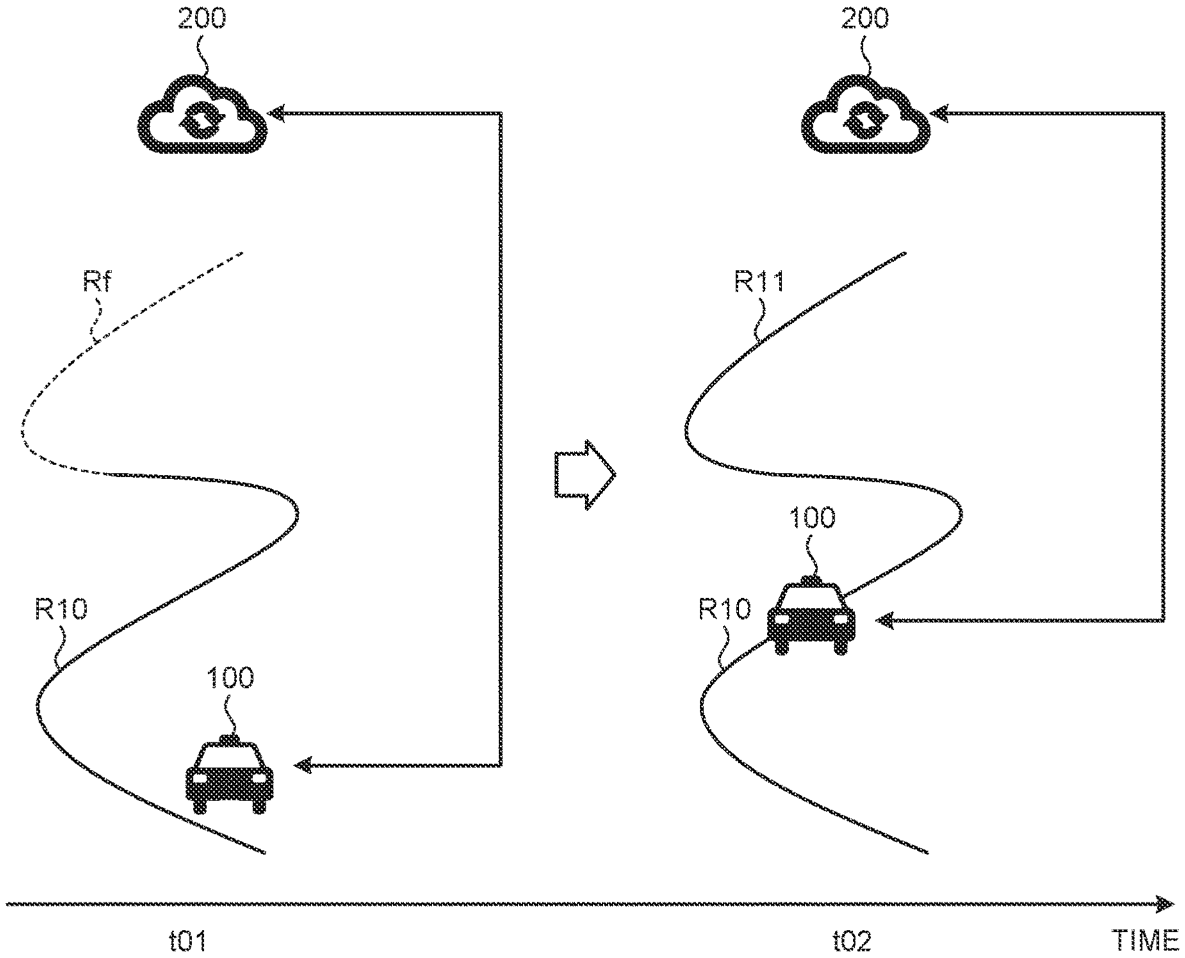
FIG. 9 is a diagram (1) for explaining movement control according to the embodiment.

Next, route following control of the real-time processing device 100 based on the route information generated by the route generation unit 224 of the cloud server 200 will be described, along with a continuous time change from a time t01 to a time t02, with reference to FIG. 9. FIG. 9 is a diagram illustrating control in which the real-time processing device 100 receives the route information from the cloud server 200 and travels following the route information. Route information R10 is generated by the cloud server 200 and is route information that the real-time processing device 100 travels and follows at the time t01. Route information Rf is route information to be generated by the cloud server 200 a predetermined time or a predetermined distance before when the real-time processing device 100 reaches the end of the route information R10, and is connected to the end of the route information R10.

At the time t01, the real-time processing device 100 performs movement control for following the route information R10 generated by the cloud server 200. At the time t02, the cloud server 200 generates route information R11 corresponding to the route information Rf at the time t01 and transmits the route information R11 to the real-time processing device 100. The real-time processing device 100 receives the route information R11 and then performs movement control for traveling following the route information R11 when reaching the end of the route information R10. In this way, until reaching the destination, the real-time processing device 100 travels following the route information while receiving the route information appropriately generated by the cloud server 200.

Figure 10:
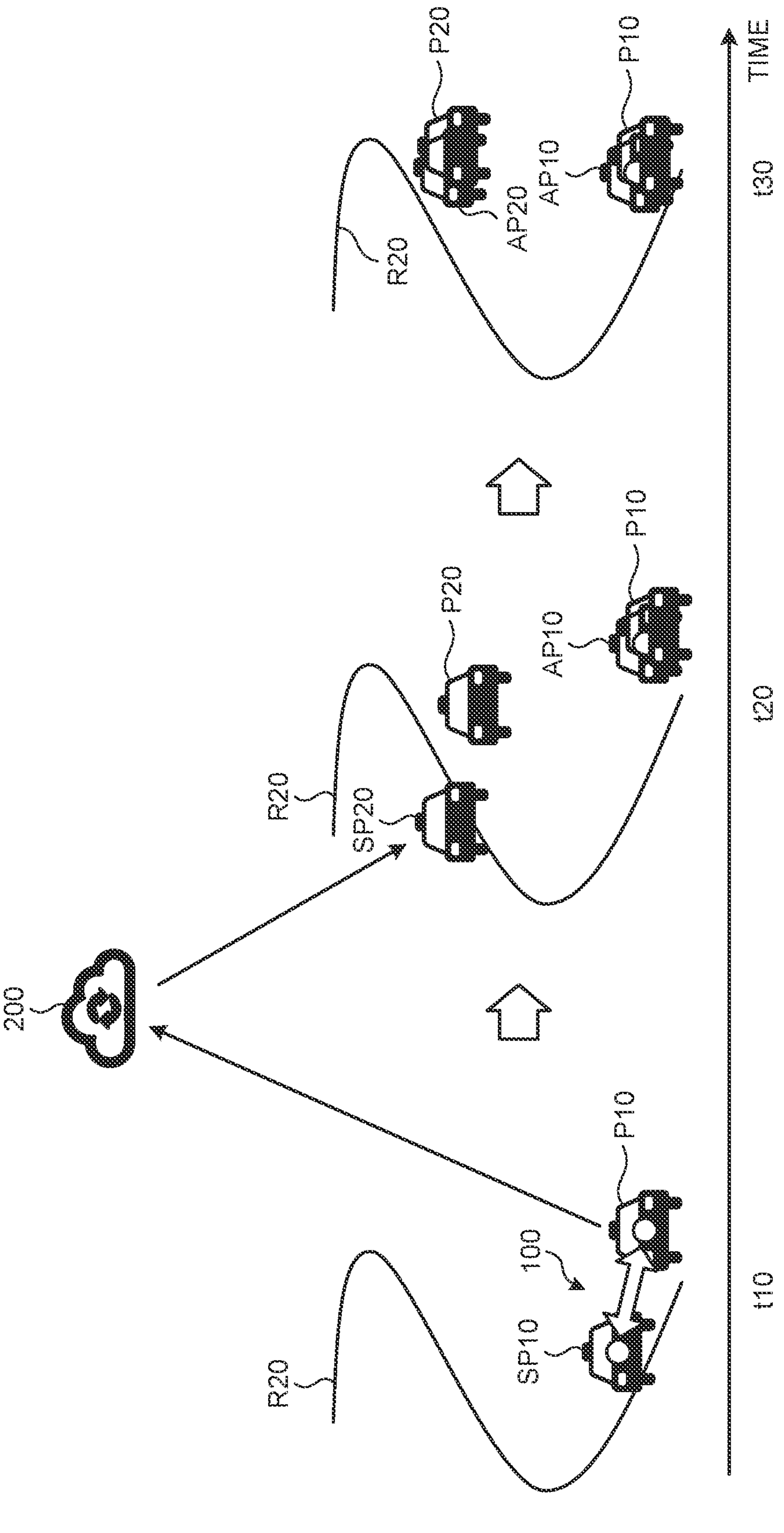
FIG. 10 is a diagram (2) for explaining the movement control according to the embodiment.

Next, with reference to FIG. 10, processing for correcting the position of the real-time processing device 100, on the basis of the position of the real-time processing device 100 recognized by the cloud server 200, by the real-time processing device 100 will be described. In FIG. 10, times t10, t20, and t30 indicate a continuous time change. At the time t10, the real-time processing device 100 travels following route information R20 generated by the cloud server 200. The real-time processing device 100 estimates that a self position of the real-time processing device 100 is a position SP10, on the basis of the sensor information of the internal sensor 140. A position P10 is an actual position of the real-time processing device 100, and as illustrated in FIG. 10, the actual position P10 of the real-time processing device 100 is different from the position PS10 estimated by the self-position estimation unit 1212.

The cloud server 200 acquires each sensor information of the first sensor 110 and the internal sensor 140 acquired by the real-time processing device 100 at the time t10 from the real-time processing device 100 and recognizes the position of the real-time processing device 100, on the basis of each piece of sensor information. The position of the real-time processing device 100 recognized by the cloud server 200 is a position of the real-time processing device 100 corresponding to the time of the time stamp given to the sensor information of the first sensor 110 and the sensor information of the internal sensor 140. That is, the position of the real-time processing device 100 recognized by the cloud server 200 is a position at the time t10, and is a past position of the real-time processing device 100 at the time when the recognition processing is completed. The cloud server 200 transmits the recognized position of the real-time processing device 100 to the real-time processing device 100.

Next, at the time t20, the real-time processing device 100 corrects the SP10 that is the self position estimation result at the time t10, on the basis of the position of the real-time processing device 100 recognized by the cloud server 200 to be AP10. As described above, since the position of the real-time processing device 100 recognized by the cloud server 200 is the position of the real-time processing device 100 at the time t10, the result of the self-position estimation to be corrected is the result of the self-position estimation at the time t10. Here, P20 is an actual position of the real-time processing device 100 at the time t20, and SP20 is a self position estimation result of the real-time processing device 100 at the time t20. Although the real-time processing device 100 recognizes at the time t20 that there is an error in the self position estimated at the time t10, the real-time processing device 100 travels following the route information R20 while the error is accumulated, at the time t20.

Next, at the time t30, the real-time processing device 100 corrects the self position SP20 estimated at the time t20 to AP20, on the basis of the corrected self position AP10 at the time t10. Since the real-time processing device 100 estimates the self position by the internal sensor 140, in a case where an error occurs, the error is accumulated during traveling. However, by using the past position recognized by the cloud server 200 as illustrated in FIG. 10, it is possible to reduce the error and estimate an accurate self position.

Next, control for avoiding a collision with an object on a route performed by the real-time processing device 100 will be described with reference to FIGS. 11 to 17. In the description of FIGS. 11 to 17, the object on the route may be detected by the object detection unit 1221 included in the safety MCU 122 of the real-time processing device 100 or by the object detection unit 223 included in the non-real-time processing unit 220 of the cloud server 200. Furthermore, a distance between the real-time processing device 100 and the object on the route may be detected by the object detection unit 1221 included in the safety MCU 122 of the real-time processing device 100 or by the object detection unit 223 included in the non-real-time processing unit 220 of the cloud server 200. However, it is desirable that both of the detection of the object on the route and the detection of the distance between the real-time processing device 100 and the object on the route be performed by the real-time processing.

First, with reference to FIGS. 11 and 12, a case will be described where the distance between the real-time processing device 100 and the object on the route is sufficiently long. Here, a case where the distance is sufficiently long indicates a case where there is a sufficient time for the real-time processing device 100 to start traveling based on the re-planned route information from the detection of the object on the route by the real-time processing device 100 to the collision. The route information is re-planned by instructing the cloud server 200 to re-plan the route information by the real-time processing device 100, re-planning the route information by the cloud server 200, and transmitting the route information to the real-time processing device 100. Then, the real-time processing device 100 starts to travel following the re-planned route information, and performs traveling so as to avoid the object on the route. Note that the real-time processing device 100 may store an average value of a time required by the cloud server 200 to re-plan the route information or the like as data. By comparing the average value of the time required by the cloud server 200 to re-plan the route information with a time before the collision calculated from the distance between the real-time processing device 100 and the object on the route, it is possible to determine whether or not the distance is sufficiently long.

Figure 11:
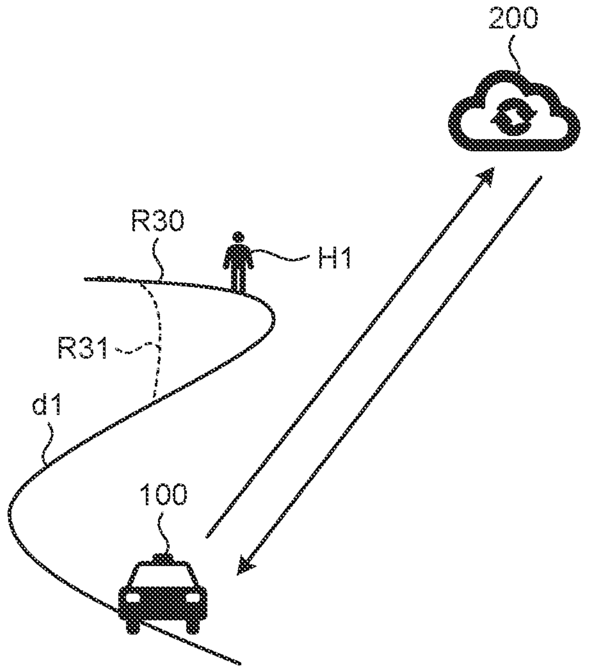
FIG. 11 is a diagram (3) for explaining the movement control according to the embodiment.

FIG. 11 is a diagram illustrating a situation where an object H1 exists away from the real-time processing device 100 by only a distance d1, on a route of route information R30 that the real-time processing device 100 travels and follows. In this case, if the traveling following the route information R30 is continued, a collision with the object H1 on the route occurs. Then, the real-time processing device 100 instructs the cloud server 200 to re-plan the route information, and the cloud server 200 re-plans the route information R30, generates route information R31 for avoiding the object H1 on the route, and transmits the route information R31 to the real-time processing device 100. The real-time processing device 100 can avoid the object H1 on the route, by traveling following the received route information R31.

Figure 12:
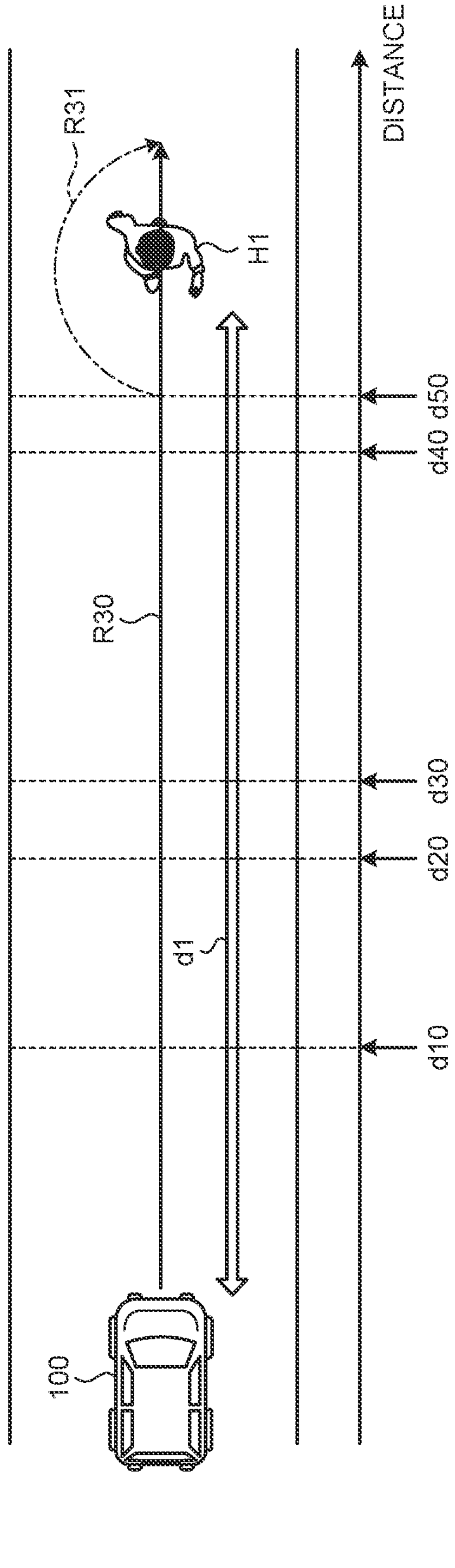
FIG. 12 is a diagram (4) for explaining the movement control according to the embodiment.

In FIG. 12, the situation in FIG. 11 is illustrated and described as a bird's-eye view. The horizontal axis in FIG. 12 indicates a distance. Here, description overlapping with FIG. 11 is omitted. In FIG. 12, a distance d10 is a distance that the real-time processing device 100 travels until the real-time processing device 100 stops, in a case where the real-time processing device 100 performs stop control using emergency braking. A distance d20 indicates a distance that the real-time processing device 100 travels before the re-planning of the route information is completed, in a case where the cloud server 200 re-plans the route information while the real-time processing device 100 decelerates by the emergency braking. A distance d30 indicates a distance that the real-time processing device 100 travels until the real-time processing device 100 starts to travel following the re-planned route information, in a case where the cloud server 200 re-plans the route information while the real-time processing device 100 decelerates by the emergency braking. A distance d40 indicates a distance that the real-time processing device 100 travels until the re-planning of the route information is completed, in a case where the cloud server 200 re-plans the route information without the emergency braking by the real-time processing device 100. A distance d50 indicates a distance that the real-time processing device 100 travels until the real-time processing device 100 starts to travel following the re-planned route plan, in a case where the cloud server 200 re-plans the route information without the emergency braking by the real-time processing device 100. Note that, since the distances d10 to d50 change depending on a speed of the real-time processing device 100, a road surface state of the route, or the like, the distances d10 to d50 merely indicate a relative distance relationship with the position of the object on the route.

As described above, the distance d1 between the real-time processing device 100 and the object H1 on the route illustrated in FIGS. 11 and 12 is longer than the distance d50. Therefore, even if the real-time processing device 100 does not perform emergency braking, it is possible to avoid the collision with the object H1 on the route by traveling following the route information re-planned by the cloud server 200.

Next, with reference to FIGS. 13 and 14, a case will be described where a distance between the real-time processing device 100 and an object H2 on the route is longer than the distance d30 and is shorter than the distance d40.

Figure 13:
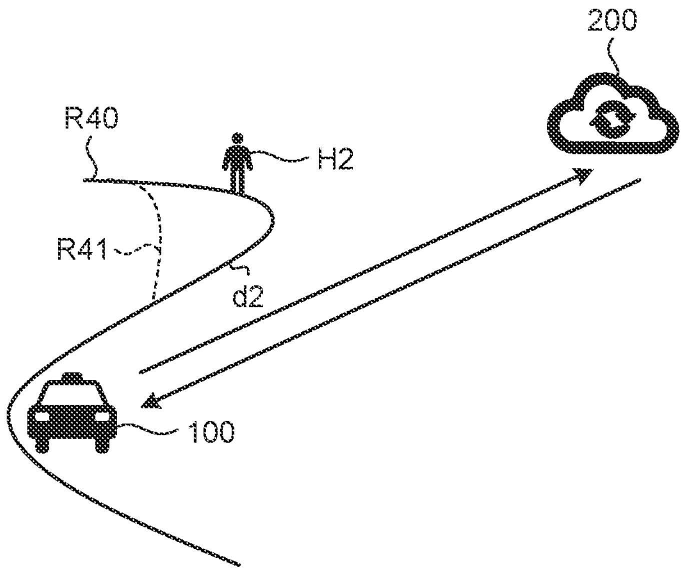
FIG. 13 is a diagram (5) for explaining the movement control according to the embodiment.

FIG. 13 is a diagram illustrating a situation where an object H2 exists away from the real-time processing device 100 by only a distance d2, on a route of route information R40 that the real-time processing device 100 travels and follows. In FIG. 13, the object H2 exists away from the real-time processing device 100 by only the distance d2, on the route of the route information R40 that the real-time processing device 100 travels and follows. In this case, if the real-time processing device 100 continues to travel following the route information R40, a collision with the object H2 on the route occurs. Therefore, the cloud server 200 re-plans the route information R40, generates route information R41 for avoiding the object H2 on the route, and transmits the route information R41 to the real-time processing device 100. The real-time processing device 100 can avoid the object H2 on the route by traveling and following the received route information R41. However, in this case, if the real-time processing device 100 does not decelerate by the emergency braking, the real-time processing device 100 reaches the distance d2 before the cloud server 200 completes the re-planning of the route information and collides with the object H2. Therefore, in this case, the real-time processing device 100 decelerates by the emergency braking. The real-time processing device 100 decelerates by the emergency braking so that the cloud server 200 completes the re-planning of the route information before the collision with the object H2 on the route, and the real-time processing device 100 can avoid the object H2 on the route. Note that, in this case, the real-time processing device 100 can avoid the collision with the object H2 by stopping by the emergency braking. However, it is preferable to decelerate by the emergency braking and travel following the route information R41 because traveling can be continued without stopping.

Figure 14:
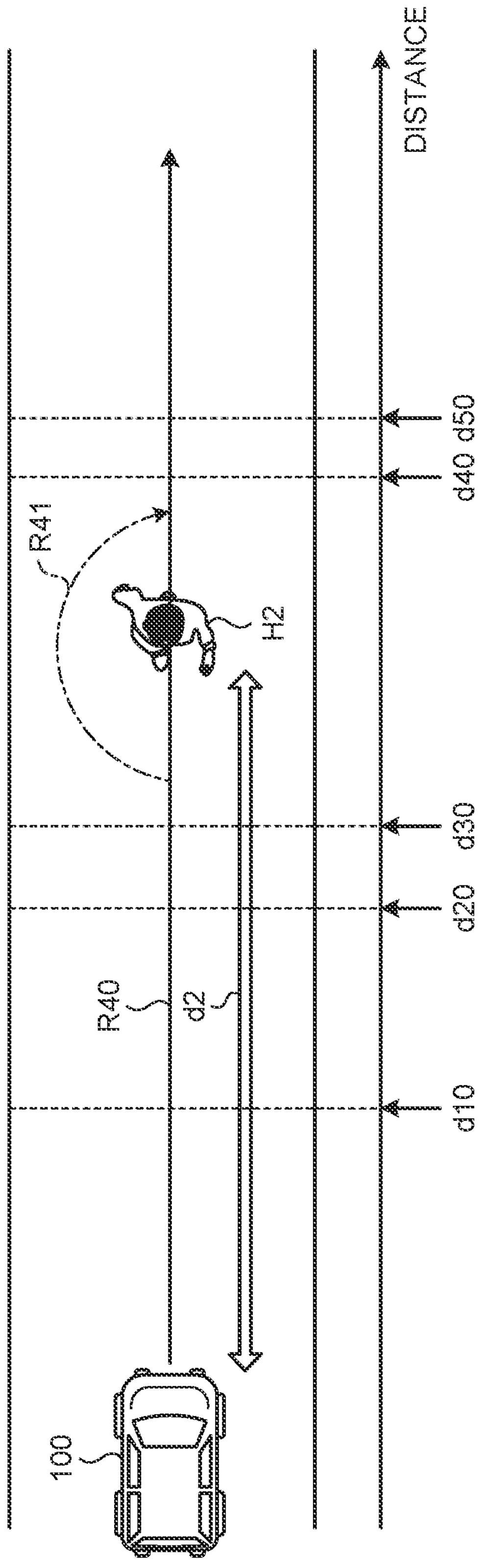
FIG. 14 is a diagram (6) for explaining the movement control according to the embodiment.

FIG. 14 is a diagram illustrating a situation where the object H2 exists away from the real-time processing device 100 *b* only the distance d2, on the route of route information R40 that the real-time processing device 100 travels and follows. FIG. 14 is a diagram for illustrating and describing the situation in FIG. 13 as a bird's-eye view. The horizontal axis in FIG. 14 indicates a distance. Here, description overlapping with FIG. 13 is omitted. As illustrated in FIG. 14, the distance d2 from the real-time processing device 100 to the object H2 on the route is a distance longer than the distance d30 and is a distance shorter than the distance d40. That is, even if the cloud server 200 generates the route information R41 so as to avoid the object H2, if the real-time processing device 100 does not perform the emergency braking, it is not possible to avoid the collision with the object H2. Therefore, the real-time processing device 100 travels following the re-planned route information R41, while decelerating by the emergency braking. As a result, the real-time processing device 100 can travel without stopping while avoiding the object H2 on the route.

Next, with reference to FIGS. 15 and 16, a case will be described where the distance between the real-time processing device 100 and the object on the route is longer than the distance d10 and is shorter than the distance d20.

Figure 15:
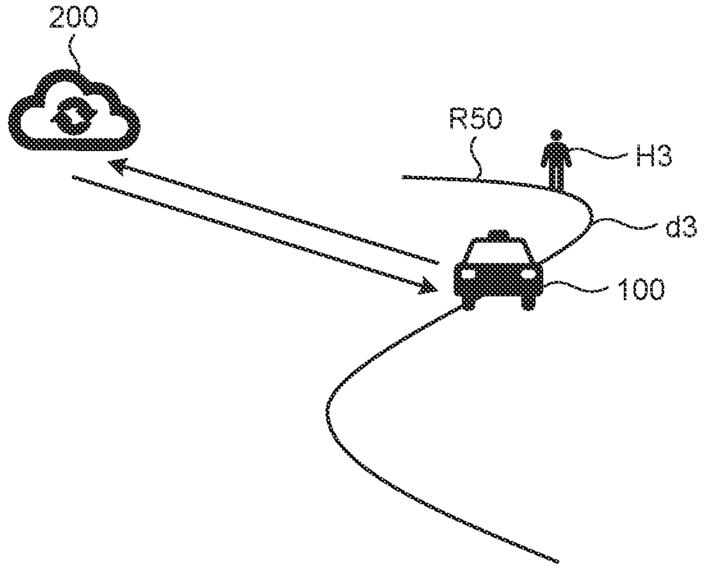
FIG. 15 is a diagram (7) for explaining the movement control according to the embodiment.

In FIG. 15, an object H3 on the route exists away from the real-time processing device 100 by only a distance d3, on a route of route information R50 that the real-time processing device 100 follows and travels. In this case, if the traveling following the route information R50 is continued, a collision with the object H3 on the route occurs. Furthermore, with this distance, even if the real-time processing device 100 decelerates by the emergency braking, there is a possibility that the cloud server 200 cannot complete the re-planning of the route information before the real-time processing device 100 collides with the object H3 on the route. Therefore, even in such a case, the real-time processing device 100 performs stop control by the emergency braking. As a result, it is possible to avoid the collision with the object H3 on the route.

Figure 16:
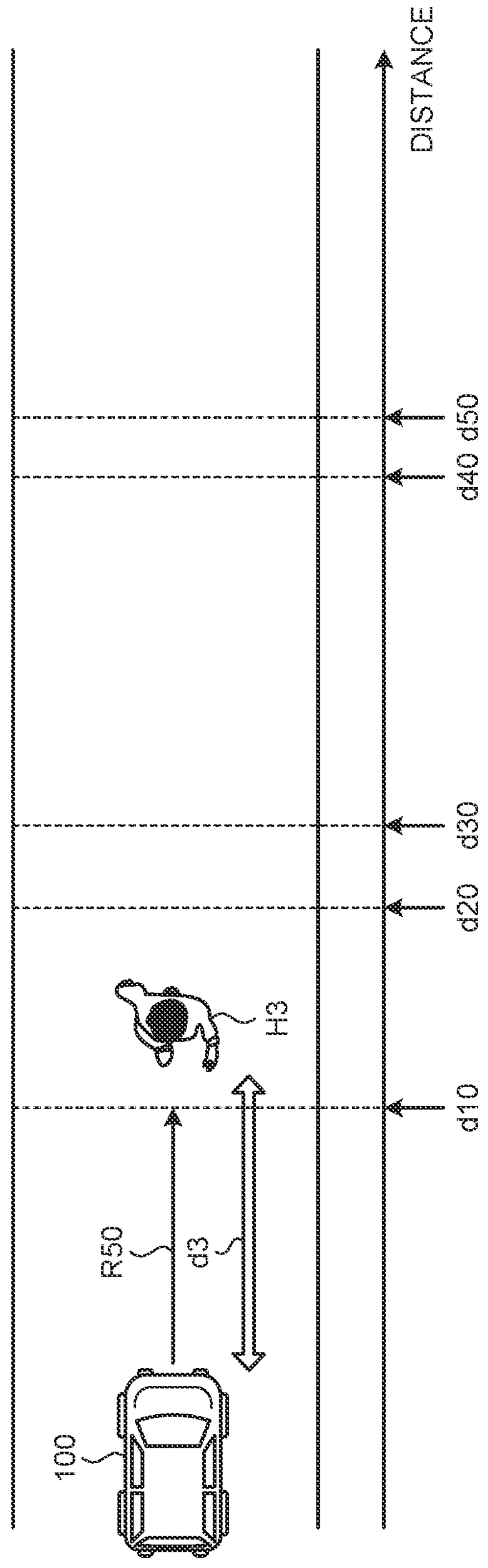
FIG. 16 is a diagram (8) for explaining the movement control according to the embodiment.

FIG. 16 is a diagram illustrating a situation in FIG. 15 as a bird's-eye view. Here, description overlapping with FIG. 15 is omitted. As illustrated in FIG. 16, the distance d3 from the real-time processing device 100 to the object H3 on the route is a distance longer than the distance d10 and is a distance shorter than the distance d20. The real-time processing device 100 executes stop processing by the emergency braking, since the re-planning of the route information by the cloud server 200 cannot made in time, according to the distance to the object H3. As a result, the real-time processing device 100 can avoid the collision with the object H3 on the route.

Figure 17:
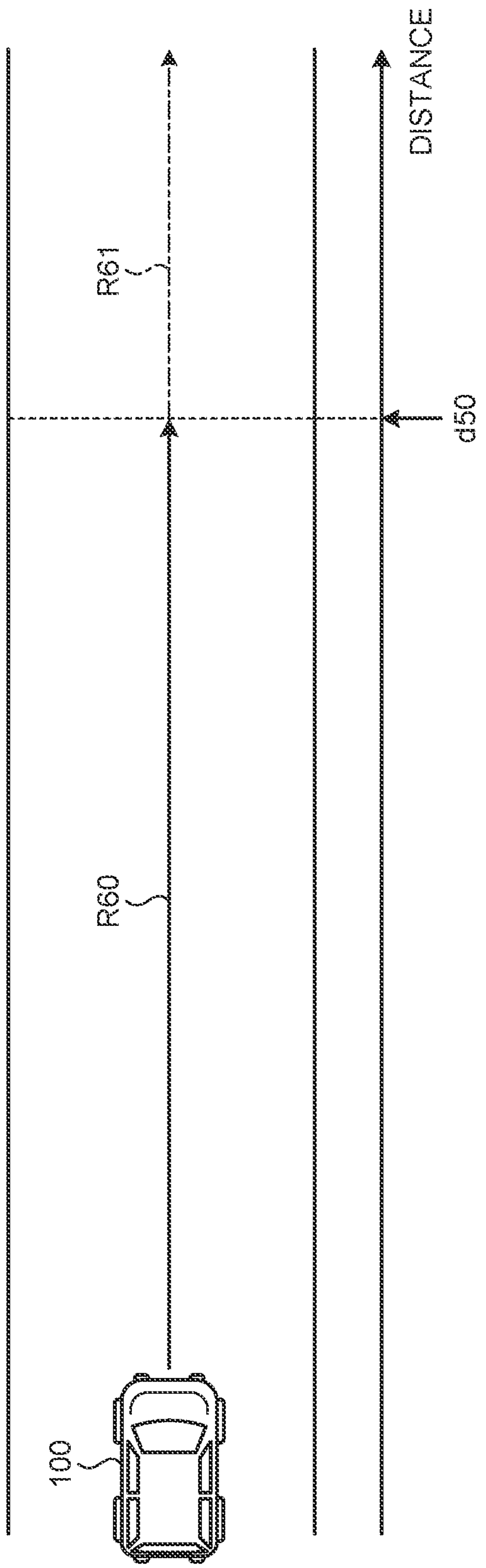
FIG. 17 is a diagram (9) for explaining the movement control according to the embodiment.

Next, with reference to FIG. 17, a case where the cloud server 200 does not respond, that is, a case where the cloud server 200 does not plan the route information for some reason will be described. The real-time processing device 100 travels following route information R60. Then, the real-time processing device 100 receives next route information R61 a predetermined time or distance before reaching an end of the route information R60 separated by only the distance d50 from the cloud server 200 and continues traveling. However, there is a case where the cloud server 200 does not respond and the real-time processing device 100 cannot receive the next route information R61 from the cloud server 200 the predetermined time of distance before the real-time processing device 100 reaching the end of the route information R60. In this case, when reaching the end of the route information R60 as keeping the speed, the real-time processing device 100 does not have the route information thereafter. Therefore, there is a possibility that the travel of the real-time processing device 100 cannot be controlled. Therefore, in a case where the real-time processing device 100 cannot receive the next route information R61 from the cloud server 200 the predetermined time or distance before reaching the end of the route information R60, the real-time processing device 100 is controlled to stop at the end of the route information R60. Note that, in this case, if the end of the route information R60 is a point where it is dangerous to stop, such as a vehicle road, the safety mechanism 1222 of the real-time processing device 100 may control the travel of the real-time processing device 100 so as to stop at a safe position.

1-3. Procedure of Movement Control According to Embodiment

Figure 18:
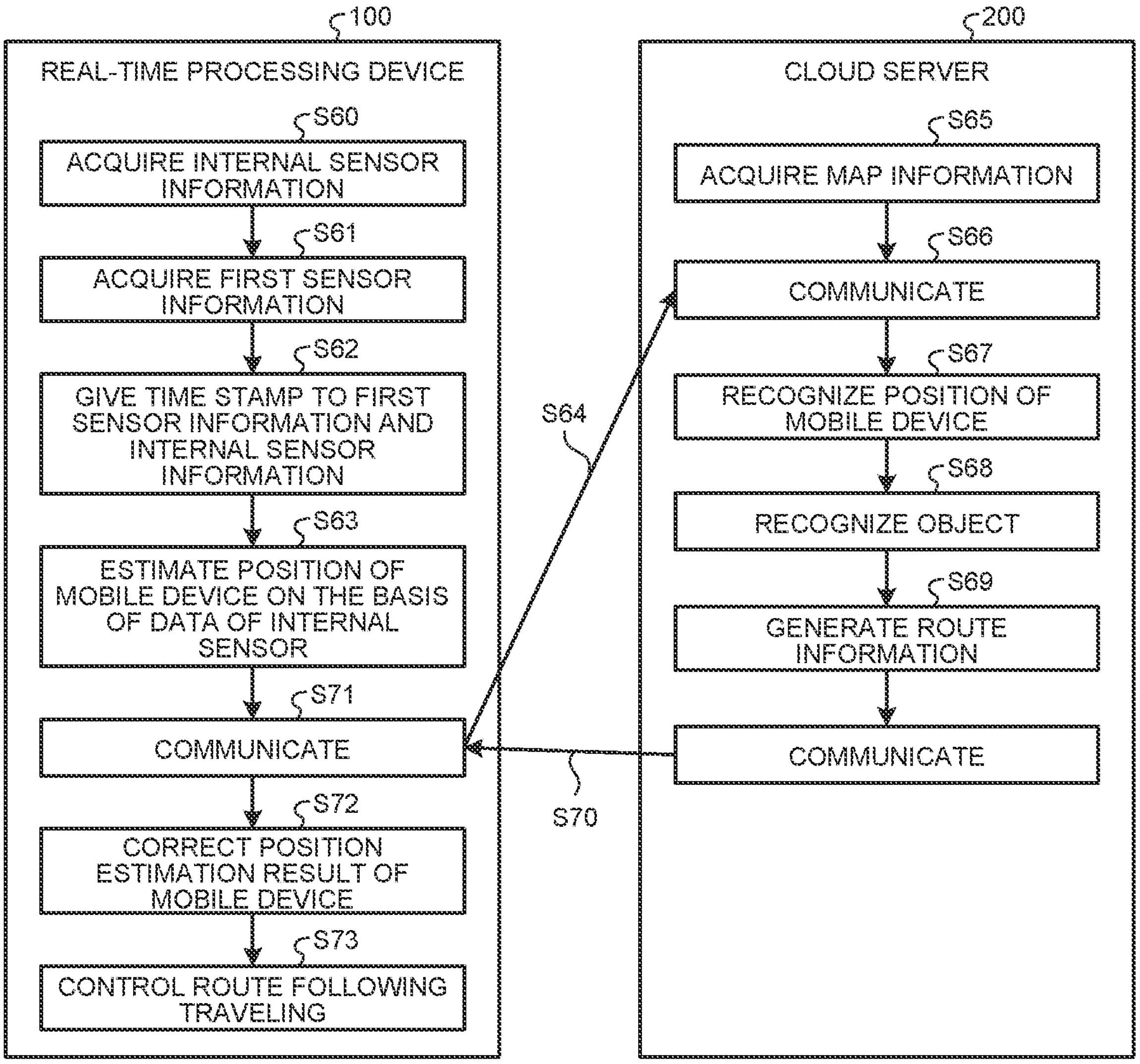
FIG. 18 is a flowchart illustrating a flow of processing according to the embodiment.

Next, a procedure of movement control according to the embodiment will be described with reference to FIG. 18. FIG. 18 is a flowchart illustrating a flow of processing according to the embodiment.

As illustrated in FIG. 18, the real-time processing device 100 acquires the internal sensor information from the internal sensor 140 (Step S60). Next, the real-time processing device 100 acquires the first sensor information from the first sensor 110 (Step S61). Note that the acquisition of the information of the internal sensor and the acquisition of the first sensor information may be simultaneously performed, or the acquisition of the first sensor information may be performed first.

Next, the real-time processing device 100 gives the time stamps to the first sensor information and the internal sensor information (Step S62). Next, the real-time processing device 100 estimates the position of the real-time processing device 100 using the internal sensor information (Step S63).

The real-time processing device 100 transmits the first sensor information and the internal sensor information to which the time stamps are given, to the cloud server 200 (Step S64).

The cloud server 200 acquires map information (Step S65). Next, the cloud server 200 receives the first sensor information and the internal sensor information to which the time stamps are given, from the real-time processing device 100 (Step S66). Note that a step of acquiring the map information by the cloud server 200 and a step of receiving the first sensor information and the internal sensor information to which the time stamps are given are not limited to be performed in this order, may be performed in a reversed order or in parallel.

Next, the cloud server 200 recognizes the position of the real-time processing device 100, on the basis of the acquired first sensor information and internal sensor information (Step S67). Moreover, the cloud server 200 recognizes an object on the route of the route information where the real-time processing device 100 is traveling, on the basis of the acquired first sensor information (Step S68). Steps S67 and S68 may be performed in a reversed order or performed in parallel.

Next, the cloud server 200 generates the route information, on the basis of the result of the object recognition on the route of the real-time processing device 100 and the result of the position recognition of the real-time processing device 100 (Step S69).

Then, the cloud server 200 transmits the generated route information and the result of the position recognition of the real-time processing device 100, to the real-time processing device 100 (step S70).

Next, the real-time processing device 100 receives the route information and the result of the position recognition, from the cloud server 200 (Step S71). Then, the real-time processing device 100 corrects the result of the position estimation in Step S63, on the basis of the result of the position recognition received from the cloud server 200 (Step S72). Here, the position estimation of the real-time processing device 100 using the internal sensor information in Step S63 may be performed at any timing as long as the position estimation is performed before Step S72.

Then, the real-time processing device 100 performs travel control so as to follow the route information, on the basis of the route information acquired in Step S71 (Step S73).

The series of above processing from Step S60 to Step S73 is repeatedly executed from a time point of travel control start to a time point of travel control end.

Figure 19:
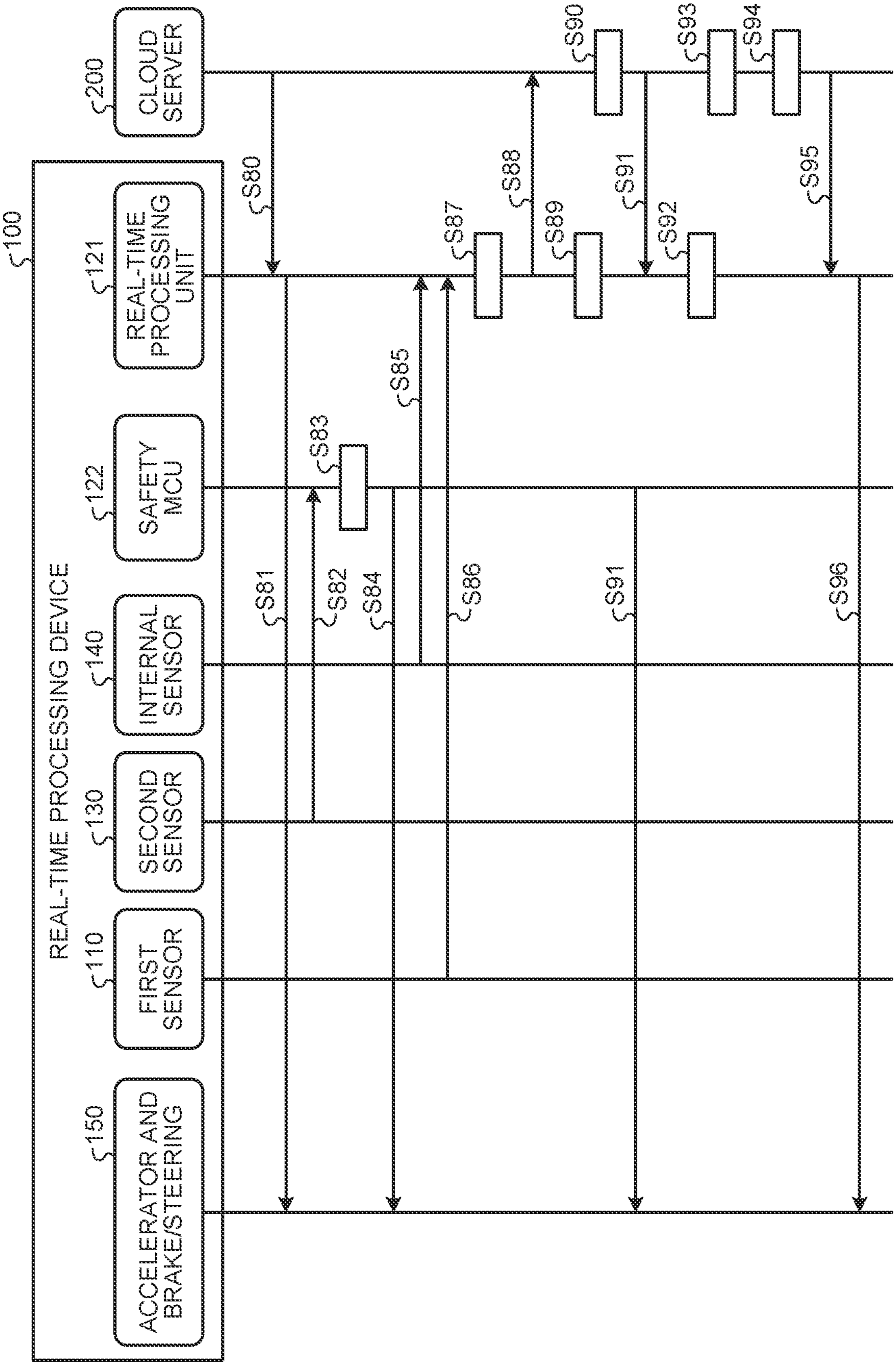
FIG. 19 is a sequence diagram illustrating a flow of processing according to the embodiment.

Next, a procedure of the series of movement control according to the embodiment will be described with reference to FIG. 19. FIG. 19 is a sequence diagram illustrating a flow of the series of movement control according to the embodiment.

First, the cloud server 200 transmits the route information to the real-time processing unit 121 (Step S80). The real-time processing unit 121 transmits the information regarding the accelerator position, the steering angle, or the like used to travel following the route, to the accelerator and brake/steering 150, on the basis of the received route information (Step S81). The accelerator and brake/steering 150 controls the accelerator and the steering on the basis of the received information regarding the accelerator position, the steering angle, or the like.

Next, the second sensor 130 transmits the second sensor information to the safety MCU 122 (Step S82). The safety MCU 122 detects an obstacle on the route, on the basis of the received second sensor information (Step S83). In a case where the safety MCU 122 detects the obstacle, the safety MCU 122 transmits the information regarding the accelerator position, the steering angle, or the like used to perform the movement control for avoiding a collision with the obstacle, to the accelerator and brake/steering 150 (Step S84).

Next, the internal sensor 140 transmits the internal sensor information to the real-time processing unit 121 (Step S85). Furthermore, the first sensor 110 transmits the first sensor information to the real-time processing unit 121 (Step S86).

The real-time processing unit 121 gives the time stamps to the received first sensor information and internal sensor information (Step S87). Moreover, the real-time processing unit 121 transmits the first sensor information and the internal sensor information to which the time stamps are given, to the cloud server 200 (Step S88).

Next, the real-time processing unit 121 estimates the position of the real-time processing device 100, on the basis of the internal sensor information (Step S89). Note that the position estimation performed by the real-time processing unit 121 on the basis of the internal sensor information can be performed even if the time stamp is not given, for example, the position estimation may be performed after Step S85 and before Step S87.

The cloud server 200 recognizes the position of the real-time processing device 100, on the basis of the received first sensor information and internal sensor information and the time stamps given to the first sensor information and the internal sensor information (Step S90).

The cloud server 200 transmits the result of the position recognition to the real-time processing unit 121 (Step S91). The real-time processing unit 121 corrects the result of the position estimation, on the basis of the received result of the position recognition (Step S92).

Furthermore, the cloud server 200 recognizes an object (lighting color of traffic light, road sign, white line recognition, moving object identification, or the like) necessary for movement control of the real-time processing device 100, on the basis of the first sensor information (Step S93). At this time, the cloud server 200 may further perform object action prediction (position of object or lighting color of traffic light after predetermined time), on the basis of time-series data of the object in the past (moving direction, speed, acceleration, lighting time of signal, or the like).

Then, the cloud server 200 generates the route information, from the result of the position recognition in Step S90 and the result of the object recognition in Step S93 (Step S94). At this time, the cloud server 200 transmits the map information stored in the cloud server and the route information, in addition to the result of the position recognition and the result of the object recognition, to the real-time processing unit 121 (Step S95).

The real-time processing unit 121 transmits the information regarding the accelerator position, the steering angle, or the like used to travel following the route, to the accelerator and brake/steering 150, on the basis of the received route information (Step S96), and performs movement control following the route information. According to the series of processing above, the real-time processing device 100 performs the movement control.

Note that the real-time processing device 100 and the cloud server 200 appropriately execute Steps S82 to S93, after Steps S80 and S81 and before Steps S95 and S96. That is, the real-time processing device 100 executes each of Steps S82 to S92 at least once, after acquiring the route information related to Step S80 and before acquiring the route information related to Step S95. Furthermore, the cloud server 200 executes each of Steps S90 to S94 at least once, after transmitting the route information related to Step S80 and before generating the next route information related to Step S94. Note that the real-time processing device 100 and the cloud server 200 do not need to execute each of Steps S82 to S93 the same number of times, and for example, only the detection of the obstacle on the route in Steps S82 and S83 may be executed a larger number of times than the other steps.

1-4. Modification According to Embodiment

The movement control according to the embodiment may be performed in various different modes other than the embodiment. Therefore, hereinafter, another embodiment of a real-time processing device 100 will be described.

In the embodiment, the non-real-time processing device is described as the cloud server 200. However, the non-real-time processing device is not limited to the cloud server 200 and may be a processor included in a mobile device.

Figure 20:
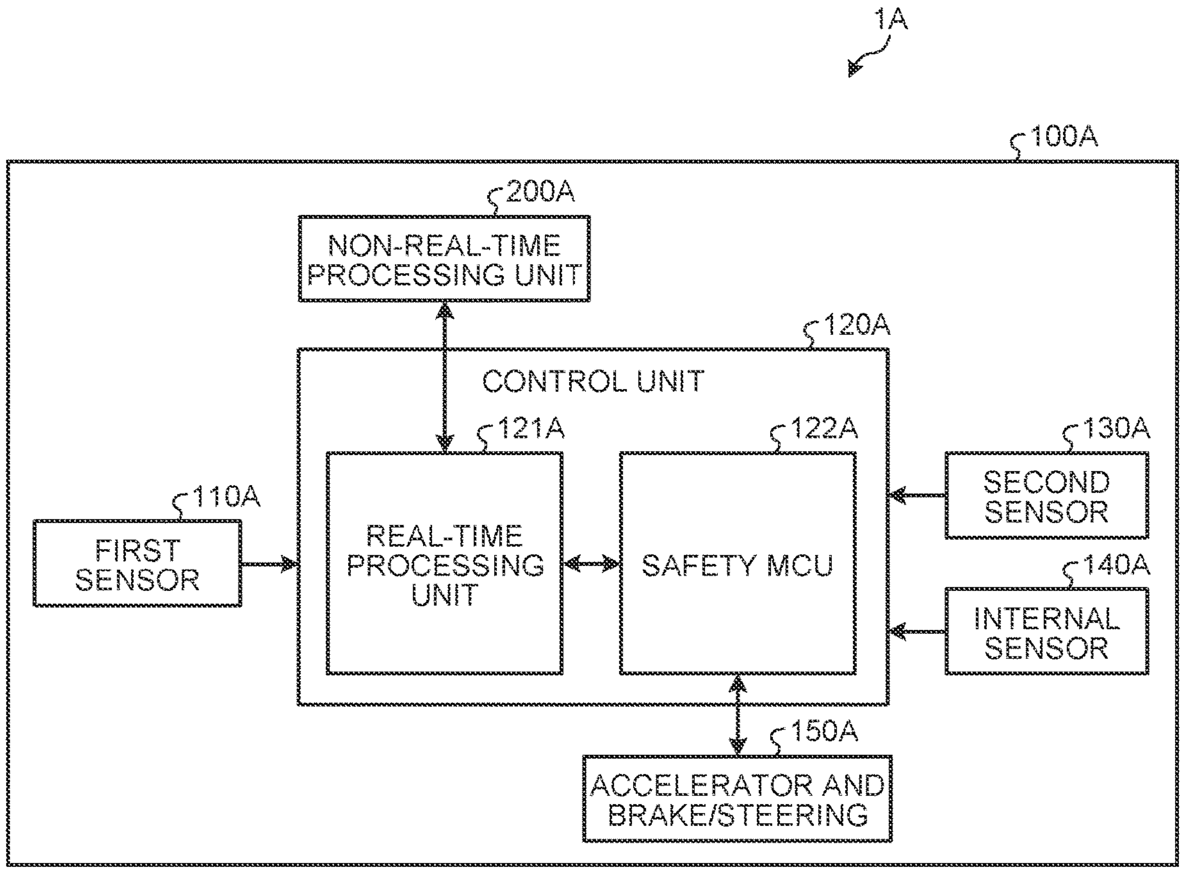
FIG. 20 is a diagram illustrating an outline of a movement control system according to a modification.

Therefore, another embodiment of the real-time processing device 100 will be described with reference to FIG. 20. In the example illustrated in FIG. 20, a movement control system 1A includes a real-time processing device 100A, and the real-time processing device 100A includes a non-real-time processing unit 200A, a first sensor 110A, a control unit 120A, a second sensor 130A, an internal sensor 140A, and an accelerator and brake/steering 150A. Furthermore, the control unit 120A includes a real-time processing unit 121A and a safety MCU 122A.

The non-real-time processing unit 200A executes processing similar to the cloud server 200 illustrated in FIG. 1. The first sensor 110A corresponds to the first sensor 110 illustrated in FIG. 1. The control unit 120A corresponds to the control unit 120 illustrated in FIG. 1. The second sensor 130A corresponds to the second sensor 130 illustrated in FIG. 1. The internal sensor 140A corresponds to the internal sensor 140 illustrated in FIG. 1. The accelerator and brake/steering 150A corresponds to the accelerator and brake/steering 150 illustrated in FIG. 1. The real-time processing unit 121A corresponds to the real-time processing unit 121 illustrated in FIG. 1. The safety MCU 122A corresponds to the safety MCU 122 illustrated in FIG. 1.

As described above, if the non-real-time processing unit 200A is configured as a device included in the processing device 100A, data communication related to the series of movement control is completed in the processing device. This causes an effect that the real-time processing device 100A is less likely to be affected by a delay of communication or the like.

2. Other Embodiments

2-1. Configuration of Mobile Device

Figure 21:
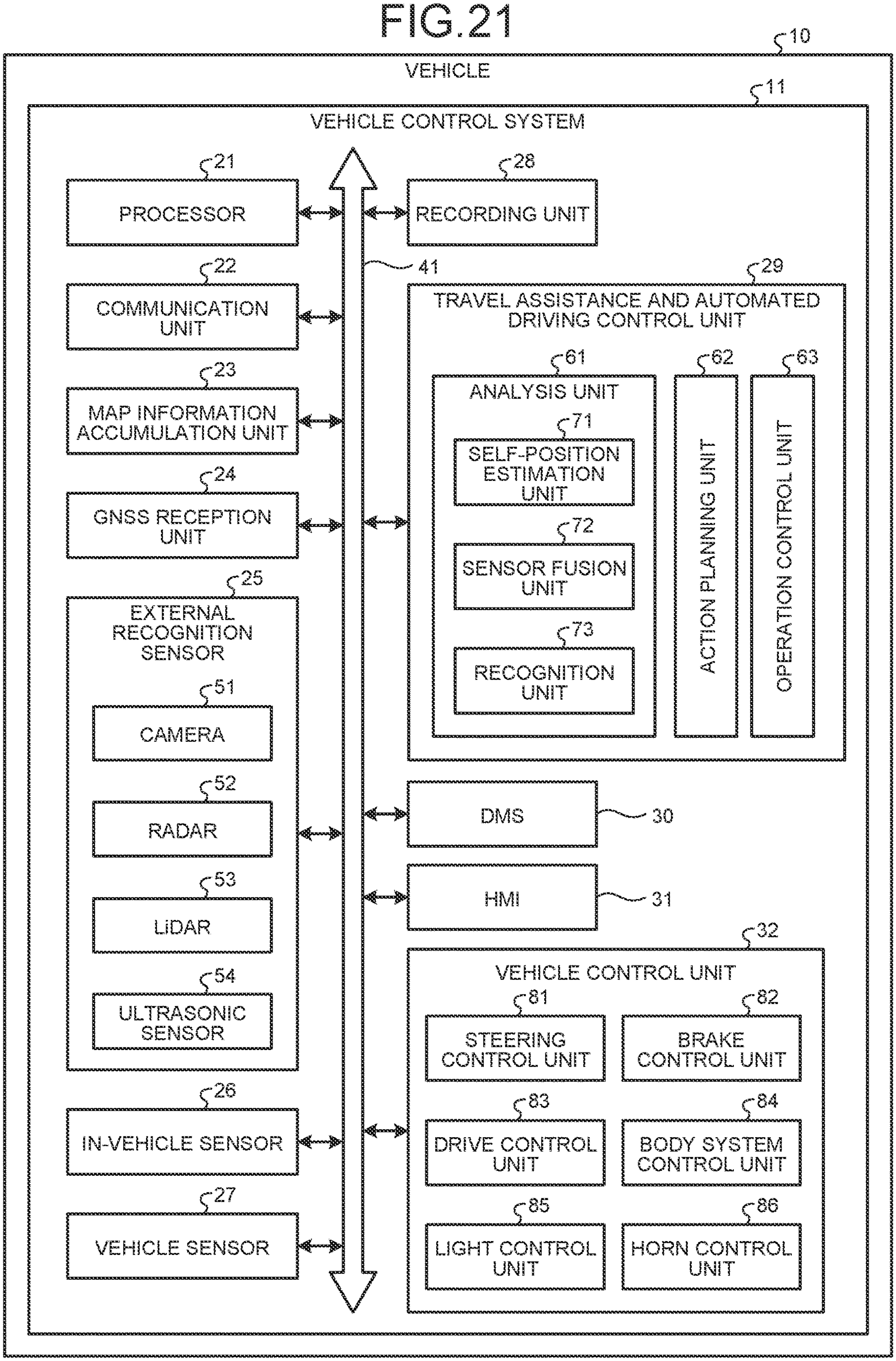
FIG. 21 is a block diagram illustrating a configuration example of the movement control system.

FIG. 21 is a block diagram illustrating a configuration example of a vehicle control system 11 that is an example of a mobile device control system to which the present technology is applied.

The vehicle control system 11 is provided in a vehicle 10 and executes processing related to travel assistance and automated driving of the vehicle 10.

The vehicle control system 11 includes a vehicle control electronic control unit (ECU) 21, a communication unit 22, a map information accumulation unit 23, a global navigation satellite system (GNSS) reception unit 24, an external recognition sensor 25, an in-vehicle sensor 26, a vehicle sensor 27, a recording unit 28, a travel assistance and automated driving control unit 29, a driver monitoring system (DMS) 30, a human machine interface (HMI) 31, and a vehicle control unit 32.

The vehicle control ECU 21, the communication unit 22, the map information accumulation unit 23, the GNSS reception unit 24, the external recognition sensor 25, the in-vehicle sensor 26, the vehicle sensor 27, the recording unit 28, the travel assistance and automated driving control unit 29, the driver monitoring system (DMS) 30, the human machine interface (HMI) 31, and the vehicle control unit 32 are communicably connected to each other via a communication network 41. The communication network 41 includes, for example, an in-vehicle communication network, a bus, or the like conforming to a digital bidirectional communicate standard such as a controller area network (CAN), a local interconnect network (LIN), a local area network (LAN), the FlexRay (registered trademark), or the Ethernet (registered trademark). The communication network 41 may be selectively used depending on a type of data to be communicated, and for example, the CAN is applied to data related to vehicle control, and the Ethernet is applied to large-capacity data. Note that each unit of the vehicle control system 11 may be directly connected using wireless communication that assumes communication at a relatively short distance, for example, near field communication (NFC) or the Bluetooth (registered trademark), not via the communication network 41.

Note that, hereinafter, in a case where each unit of the vehicle control system 11 performs communication via the communication network 41, the description of the communication network 41 is omitted. For example, in a case where the vehicle control ECU 21 and the communication unit 22 communicate via the communication network 41, it is simply described that the vehicle control ECU 21 and the communication unit 22 communicate.

The vehicle control ECU 21 includes various processors, for example, a central processing unit (CPU), a micro processing unit (MPU), or the like. The vehicle control ECU 21 controls all or some of functions of the vehicle control system 11.

The communication unit 22 communicates with various devices inside and outside the vehicle, other vehicles, a server, a base station, or the like and transmits and receives various types of data. At this time, the communication unit 22 can perform communication using a plurality of communication methods.

Communication with outside the vehicle that can be performed by the communication unit 22 will be schematically described. For example, the communication unit 22 communicates with a server existing on an external network (hereinafter, referred to as external server) or the like, via a base station or an access point, with a wireless communication method such as the 5th generation mobile communication system (5G), the long term evolution (LTE), or the dedicated short range communications (DSRC). The external network with which the communication unit 22 communicates is, for example, the Internet, a cloud network, or a network unique to a company, or the like. A communication method for performing communication with the external network by the communication unit 22 is not particularly limited, as long as the communication method is a wireless communication method that can perform digital bidirectional communication at a communication speed equal or more than a predetermined speed and at a distance equal to or longer than a predetermined distance.

Furthermore, for example, the communication unit 22 can communicate with a terminal existing near the own vehicle, using the peer to peer (P2P) technology. The terminal existing near the own vehicle is, for example, a terminal attached to a mobile body that is moving at a relatively low speed, such as a pedestrian or a bicycle, a terminal installed at a fixed position in a store or the like, or a machine type communication (MTC) terminal. Moreover, the communication unit 22 can perform V2X communication. The V2X communication is communication between the own vehicle and others, for example, vehicle to vehicle communication with another vehicle, vehicle to infrastructure communication with a roadside device or the like, vehicle to home communication with home, vehicle to pedestrian communication with a terminal owned by a pedestrian, or the like.

The communication unit 22 can receive a program used to update software for controlling an operation of the vehicle control system 11 from outside (Over The Air), for example. The communication unit 22 can further receive map information, traffic information, information around the vehicle 10, or the like from outside. Furthermore, for example, the communication unit 22 can transmit information regarding the vehicle 10, the information around the vehicle 10, or the like to the outside. The information regarding the vehicle 10 to be transmitted to the outside by the communication unit 22 is, for example, data indicating a state of the vehicle 10, a recognition result by a recognition unit 73, or the like. Moreover, for example, the communication unit 22 performs communication corresponding to a vehicle emergency call system such as an eCall.

The communication with inside of the vehicle that can be performed by the communication unit 22 will be schematically described. The communication unit 22 can communicate with each device in the vehicle, for example, using wireless communication. The communication unit 22 can perform wireless communication with a device in the vehicle, for example, with a communication method capable of performing digital bidirectional communication at a communication speed equal to or higher than the predetermined speed through wireless communication, such as a wireless LAN, the Bluetooth, NFC, or a wireless USB (WUSB). The communication unit 22 is not limited to this, and the communication unit 22 can communicate with each device in the vehicle using wired communication. For example, the communication unit 22 can communicate with each device in the vehicle through wired communication via a cable connected to a connection terminal (not illustrated). The communication unit 22 can communicate with each device in the vehicle, with a communication method capable of performing the digital bidirectional communication at the communication speed equal to or higher than the predetermined speed through wired communication, for example, a universal serial bus (USB), the High-definition multimedia interface (HDMI) (registered trademark), and a mobile high-definition link (MHL).

Here, the device in the vehicle indicates, for example, a device that is not connected to the communication network 41 in the vehicle. As the device in the vehicle, for example, a mobile device or a wearable device owned by an occupant such as a driver, an information device brought into the vehicle and temporarily provided in the vehicle, or the like is assumed.

For example, the communication unit 22 receives electromagnetic waves transmitted from a radio wave beacon, an optical beacon, or a vehicle information and communication system (VICS) (registered trademark) such as FM multiplex broadcasting.

The map information accumulation unit 23 accumulates one or both of a map acquired from outside and a map created in the vehicle 10. For example, the map information accumulation unit 23 accumulates a three-dimensional high-precision map, a global map that has lower accuracy than the high-precision map and covers a wider area, or the like.

The high-precision map is, for example, a dynamic map, a point cloud map, a vector map, or the like. The dynamic map is, for example, a map including four layers including dynamic information, semi-dynamic information, semi-static information, and static information and is provided from an external server or the like to the vehicle 10. The point cloud map is a map including a point cloud (point cloud data). Here, it is assumed that the vector map indicated a map adapted to an advanced driver assistance system (ADAS) in which traffic information such as positions of a lane and a signal is associated with the point cloud map.

The point cloud map and the vector map may be provided, for example, from an external server or the like, and may be created by the vehicle 10 as a map for matching with a local map to be described later, on the basis of sensing results of a radar 52, a LiDAR 53, or the like and accumulated in the map information accumulation unit 23. Furthermore, in a case where the high-precision map is provided from the external server or the like, in order to reduce a communication capacity, for example, map data of several hundred meters square regarding a planned route where the vehicle 10 will travel is acquired from the external server or the like.

The position information acquisition unit 24 receives a GNSS signal from a GNSS signal satellite and acquires position information of the vehicle 10. The received GNSS signal is supplied to the travel assistance and automated driving control unit 29. Note that the position information acquisition unit 24 may acquire the position information, for example, using a beacon, without limiting to the method using the GNSS signal.

The external recognition sensor 25 includes various sensors used to recognize an external situation of the vehicle 10 and supplies sensor data from each sensor to each unit of the vehicle control system 11. The type and the number of sensors included in the external recognition sensor 25 may be arbitrary.

For example, the external recognition sensor 25 includes a camera 51, a radar 52, a light detection and ranging, laser imaging detection and ranging (LiDAR) 53, and an ultrasonic sensor 54. Without limiting to this, the external recognition sensor 25 may have a configuration including one or more sensors of the camera 51, the radar 52, the LiDAR 53, and the ultrasonic sensor 54. The numbers of cameras 51, radars 52, LiDARs 53, and ultrasonic sensors 54 are not particularly limited as long as they can be practically installed in the vehicle 10. Furthermore, the type of the sensor included in the external recognition sensor 25 is not limited to this example, and the external recognition sensor 25 may include another type of sensor. An example of a sensing region of each sensor included in the external recognition sensor 25 will be described later.

Note that an imaging method of the camera 51 is not particularly limited as long as the imaging method is an imaging method capable of performing distance measurement. For example, as the camera 51, cameras of various imaging methods such as a time of flight (ToF) camera, a stereo camera, a monocular camera, and an infrared camera can be applied as necessary. The camera 51 is not limited to this, and the camera 51 may simply acquire a captured image regardless of distance measurement.

Furthermore, for example, the external recognition sensor 25 can include an environment sensor for detecting an environment for the vehicle 10. The environment sensor is a sensor for detecting an environment such as weather, climate, or brightness, and can include various sensors such as a raindrop sensor, a fog sensor, a sunshine sensor, a snow sensor, and an illuminance sensor, for example.

Moreover, for example, the external recognition sensor 25 includes a microphone used to detect a sound around the vehicle 10, a position of a sound source, or the like.

The in-vehicle sensor 26 includes various sensors for detecting information regarding the inside of the vehicle, and supplies sensor data from each sensor to each unit of the vehicle control system 11. The types and the number of various sensors included in the in-vehicle sensor 26 are not particularly limited as long as they can be practically installed in the vehicle 10.

For example, the in-vehicle sensor 26 can include one or more sensors of a camera, a radar, a seating sensor, a steering wheel sensor, a microphone, and a biological sensor. For example, as the camera included in the in-vehicle sensor 26, cameras of various imaging methods capable of performing distance measurement such as a time of flight (ToF) camera, a stereo camera, a monocular camera, and an infrared camera can be used. The camera is not limited to this, and the camera included in the in-vehicle sensor 26 may simply acquire a captured image regardless of distance measurement. The biological sensor included in the in-vehicle sensor 26 is provided in, for example, a seat, a steering wheel, or the like, and detects various types of biological information of the occupant such as the driver.

The vehicle sensor 27 includes various sensors for detecting the state of the vehicle 10, and supplies sensor data from each sensor to each unit of the vehicle control system 11. The types and the number of various sensors included in the vehicle sensor 27 are not particularly limited as long as they can be practically installed in the vehicle 10.

For example, the vehicle sensor 27 includes a speed sensor, an acceleration sensor, an angular velocity sensor (gyro sensor), and an inertial measurement unit (IMU) as an integrated sensor including these sensors. For example, the vehicle sensor 27 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 27 includes a rotation sensor that detects the number of rotations of an engine or a motor, an air pressure sensor that detects the air pressure of a tire, a slip rate sensor that detects a slip rate of the tire, and a wheel speed sensor that detects a rotation speed of a wheel. For example, the vehicle sensor 27 includes a battery sensor that detects a remaining amount and a temperature of a battery, and an impact sensor that detects an external impact.

The recording unit 28 includes at least one of a non-volatile storage medium or a volatile storage medium, and stores data and a program. The recording unit 28 is used as, for example, an electrically erasable programmable read only memory (EEPROM) and a random access memory (RAM), and a magnetic storage device such as a hard disc drive (HDD), a semiconductor storage device, an optical storage device, and a magneto-optical storage device can be applied as the storage medium. The recording unit 28 records various programs and data used by each unit of the vehicle control system 11. For example, the recording unit 28 includes an event data recorder (EDR) and a data storage system for automated driving (DSSAD), and records information of the vehicle 10 before and after an event such as an accident and biological information acquired by the in-vehicle sensor 26.

The travel assistance and automated driving control unit 29 controls travel assistance and automated driving of the vehicle 10. For example, the travel assistance and automated driving control unit 29 includes an analysis unit 61, an action planning unit 62, and an operation control unit 63.

The analysis unit 61 executes analysis processing on the vehicle 10 and a situation around the vehicle 10. The analysis unit 61 includes a self-position estimation unit 71, a sensor fusion unit 72, and the recognition unit 73.

The self-position estimation unit 71 estimates a self-position of the vehicle 10, on the basis of the sensor data from the external recognition sensor 25 and the high-precision map accumulated in the map information accumulation unit 23. For example, the self-position estimation unit 71 generates the local map on the basis of the sensor data from the external recognition sensor 25, and estimates the self-position of the vehicle 10 by matching the local map with the high-precision map. The position of the vehicle 10 is based on, for example, a center of a rear wheel pair axle.

The local map is, for example, a three-dimensional high-precision map created using a technology such as simultaneous localization and mapping (SLAM), an occupancy grid map, or the like. The three-dimensional high-precision map is, for example, the above-described point cloud map or the like. The occupancy grid map is a map in which a three-dimensional or two-dimensional space around the vehicle 10 is divided into grids (lattices) with a predetermined size, and an occupancy state of an object is represented in units of grids. The occupancy state of the object is represented by, for example, the presence or absence or an existence probability of the object. The local map is also used for detection processing and recognition processing on the situation outside the vehicle 10 by the recognition unit 73, for example.

Note that the self-position estimation unit 71 may estimate the self-position of the vehicle 10 on the basis of the GNSS signal and the sensor data from the vehicle sensor 27.

The sensor fusion unit 72 executes sensor fusion processing for combining a plurality of different types of sensor data (for example, image data supplied from camera 51 and sensor data supplied from radar 52), to acquire new information. Methods for combining different types of sensor data include integration, fusion, association, and the like.

The recognition unit 73 executes the detection processing for detecting the situation outside the vehicle 10 and the recognition processing for recognizing the situation outside the vehicle 10.

For example, the recognition unit 73 executes the detection processing and the recognition processing on the situation outside the vehicle 10, on the basis of the information from the external recognition sensor 25, the information from the self-position estimation unit 71, the information from the sensor fusion unit 72, or the like.

Specifically, for example, the recognition unit 73 executes the detection processing, the recognition processing, or the like on the object around the vehicle 10. The object detection processing is, for example, processing for detecting presence or absence, size, shape, position, motion, or the like of an object. The object recognition processing is, for example, processing for recognizing an attribute such as a type of an object or identifying a specific object. The detection processing and the recognition processing, however, are not necessarily clearly separated and may overlap.

For example, the recognition unit 73 detects an object around the vehicle 10 by performing clustering to classify a point cloud based on the sensor data by the LiDAR 53, the radar 52, or the like for each cluster of a point cloud. As a result, the presence or absence, size, shape, and position of the object around the vehicle 10 are detected.

For example, the recognition unit 73 detects a motion of the object around the vehicle 10 by performing tracking for following a motion of the cluster of the point cloud classified by clustering. As a result, a speed and a traveling direction (movement vector) of the object around the vehicle 10 are detected.

For example, the recognition unit 73 detects or recognizes a vehicle, a person, a bicycle, an obstacle, a structure, a road, a traffic light, a traffic sign, a road sign, and the like with respect to the image data supplied from the camera 51. Furthermore, the type of the object around the vehicle 10 may be recognized by executing recognition processing such as semantic segmentation.

For example, the recognition unit 73 can execute processing for recognizing traffic rules around the vehicle 10 on the basis of the map accumulated in the map information accumulation unit 23, the estimation result of the self-position by the self-position estimation unit 71, and the recognition result of the object around the vehicle 10 by the recognition unit 73. Through this processing, the recognition unit 73 can recognize a position and state of a signal, content of traffic signs and road signs, content of traffic regulations, travelable lanes, and the like.

For example, the recognition unit 73 can execute the recognition processing on a surrounding environment of the vehicle 10. As the surrounding environment to be recognized by the recognition unit 73, a weather, a temperature, a humidity, brightness, a road surface condition, or the like are assumed.

The action planning unit 62 creates an action plan for the vehicle 10. For example, the action planning unit 62 creates the action plan by executing processing of route planning and route following.

Note that the route planning (Global path planning) is processing for planning a rough route from a start to a goal. This route planning is called track planning, and also includes processing of track generation (local path planning) that allows safe and smooth traveling near the vehicle 10, in consideration of motion characteristics of the vehicle 10 in the route planned by the route planning. The route planning may be distinguished as long-term route planning, and startup generation may be distinguished as short-term route planning or local route planning. A safety-first route represents a concept similar to the startup generation, the short-term route planning, or the local route planning.

The route following is processing for planning an operation for safely and accurately traveling on the route planned by the route planning within a planned time. The action planning unit 62 can calculate a target speed and a target angular velocity of the vehicle 10, on the basis of the result of the route following processing, for example.

The operation control unit 63 controls the operation of the vehicle 10 in order to achieve the action plan created by the action planning unit 62.

For example, the operation control unit 63 controls a steering control unit 81, a brake control unit 82, and a drive control unit 83 included in the vehicle control unit 32 to be described later, to control acceleration/deceleration and the direction so that the vehicle 10 travels on a track calculated by the track planning. For example, the operation control unit 63 performs cooperative control for the purpose of implementing functions of the ADAS such as collision avoidance or impact mitigation, following traveling, vehicle speed maintaining traveling, collision warning of the own vehicle, or lane deviation warning of the host vehicle. For example, the operation control unit 63 performs cooperative control for the purpose of automated driving or the like in which a vehicle autonomously travels without depending on an operation of a driver.

The DMS 30 executes driver authentication processing, recognition processing on a state of the driver, or the like, on the basis of the sensor data from the in-vehicle sensor 26, the input data input to the HMI 31 to be described later, or the like. In this case, as the state of the driver to be recognized by the DMS 30, for example, a physical condition, an alertness, a concentration degree, a fatigue degree, a line-of-sight direction, a degree of drunkenness, a driving operation, a posture, or the like are assumed.

Note that the DMS 30 may execute processing for authenticating an occupant other than the driver, and processing for recognizing a state of the occupant. Furthermore, for example, the DMS 30 may execute processing for recognizing a situation in the vehicle, on the basis of the sensor data from the in-vehicle sensor 26. As the situation in the vehicle to be recognized, for example, a temperature, a humidity, brightness, odor, or the like are assumed.

The HMI 31 inputs various types of data, instructions, or the like, and presents various types of data to the driver or the like.

The input of the data by the HMI 31 will be schematically described. The HMI 31 includes an input device for a person to input data. The HMI 31 generates an input signal on the basis of the data, the instruction, or the like input with the input device, and supplies the input signal to each unit of the vehicle control system 11. The HMI 31 includes, for example, an operator such as a touch panel, a button, a switch, or a lever as the input device. Without being limited to this, the HMI 31 may further include an input device capable of inputting information by a method using voice or gesture, other than a manual operation. Moreover, the HMI 31 may use, for example, a remote control device using infrared rays or radio waves, or an external connection device such as a mobile device or a wearable device corresponding to the operation of the vehicle control system 11, as the input device.

The presentation of data by the HMI 31 will be schematically described. The HMI 31 generates visual information, auditory information, and haptic information regarding an occupant or outside of a vehicle.

Furthermore, the HMI 31 performs output control for controlling output, output content, an output timing, an output method, or the like of each piece of generated information. The HMI 31 generates and outputs, for example, information indicated by an image or light of an operation screen, a state display of the vehicle 10, a warning display, a monitor image indicating a situation around the vehicle 10, or the like, as the visual information. Furthermore, the HMI 31 generates and outputs information indicated by sounds such as voice guidance, a warning sound, or a warning message, for example, as the auditory information. Moreover, the HMI 31 generates and outputs, for example, information given to a tactile sense of an occupant by force, vibration, motion, or the like as the haptic information.

As an output device with which the HMI 31 outputs the visual information, for example, a display device that presents the visual information by displaying an image by itself or a projector device that presents the visual information by projecting an image can be applied. Note that the display device may be a device that displays the visual information in the field of view of the occupant, such as a head-up display, a transmissive display, or a wearable device having an augmented reality (AR) function, for example, in addition to a display device having an ordinary display. Furthermore, the HMI 31 can use a display device included in a navigation device, an instrument panel, a camera monitoring system (CMS), an electronic mirror, a lamp, or the like provided in the vehicle 10, as the output device that outputs the visual information.

As an output device with which the HMI 31 outputs the auditory information, for example, an audio speaker, a headphone, or an earphone can be applied.

As an output device with which the HMI 31 outputs the haptic information, for example, a haptic element using a haptic technology can be applied. The haptic element is provided, for example, in a portion to be touched by the occupant of the vehicle 10, such as a steering wheel or a seat.

The vehicle control unit 32 controls each unit of the vehicle 10. The vehicle control unit 32 includes the steering control unit 81, the brake control unit 82, the drive control unit 83, a body system control unit 84, a light control unit 85, and a horn control unit 86.

The steering control unit 81 performs detection, control, or the like of a state of a steering system of the vehicle 10. The steering system includes, for example, a steering mechanism including a steering wheel or the like, an electric power steering, or the like. The steering control unit 81 includes, for example, a control unit such as an ECU that controls the steering system, an actuator that drives the steering system, or the like.

The brake control unit 82 performs detection, control, or the like of a state of a brake system of the vehicle 10. The brake system includes, for example, a brake mechanism including a brake pedal or the like, an antilock brake system (ABS), a regenerative brake mechanism, or the like. The brake control unit 82 includes, for example, a control unit such as an ECU that controls the brake system, or the like.

The drive control unit 83 performs detection, control, or the like of a state of a drive system of the vehicle 10. The drive system includes, for example, an accelerator pedal, a driving force generation device for generating a driving force such as an internal combustion engine or a driving motor, a driving force transmission mechanism for transmitting the driving force to wheels, or the like. The drive control unit 83 includes, for example, a control unit such as an ECU that controls the drive system, or the like.

The body system control unit 84 performs detection, control, or the like of a state of a body system of the vehicle 10. The body system includes, for example, a keyless entry system, a smart key system, a power window device, a power seat, an air conditioner, an airbag, a seat belt, a shift lever, or the like. The body system control unit 84 includes, for example, a control unit such as an ECU that controls the body system, or the like.

The light control unit 85 performs detection, control, or the like of states of various lights of the vehicle 10. As the lights to be controlled, for example, a headlight, a backlight, a fog light, a turn signal, a brake light, a projection light, a bumper indicator, or the like are assumed. The light control unit 85 includes a control unit such as an ECU that performs light control, or the like.

The horn control unit 86 performs detection, control, or the like of a state of a car horn of the vehicle 10. The horn control unit 86 includes, for example, a control unit such as an ECU that controls the car horn, or the like.

Figure 22:
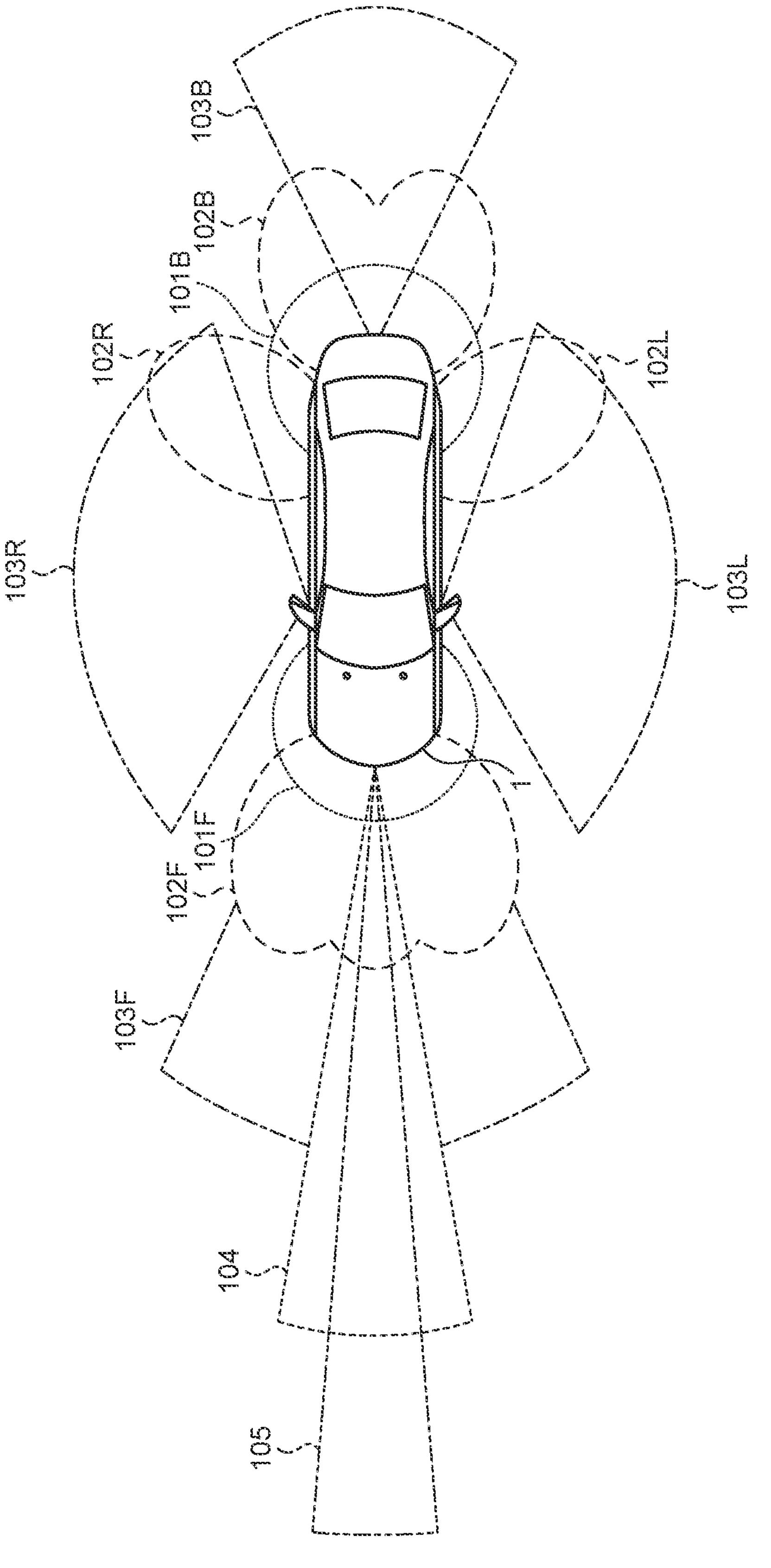
FIG. 22 is a diagram illustrating an example of a sensing region according to the embodiment.

FIG. 22 is a diagram illustrating an example of a sensing region by the camera 51, the radar 52, the LiDAR 53, the ultrasonic sensor 54, or the like of the external recognition sensor 25 in FIG. 21. Note that FIG. 22 schematically illustrates a state of the vehicle 10 as viewed from above, where a left end side is the front end (front) side of the vehicle 10, and a right end side is the rear end (rear) side of the vehicle 10.

Sensing regions 101F and 101B illustrate examples of the sensing region of the ultrasonic sensor 54. The sensing region 101F covers a region around the front end of the vehicle 10 by the plurality of ultrasonic sensors 54. The sensing region 101B covers a region around the rear end of the vehicle 10 by the plurality of ultrasonic sensors 54.

Sensing results in the sensing regions 101F and 101B are used, for example, for parking assistance of the vehicle 10 or the like.

Sensing regions 102F to 102B illustrate examples of the sensing region of the radar 52 for short distance or medium distance. The sensing region 102F covers a position farther than the sensing region 101F, on the front side of the vehicle 10. The sensing region 102B covers a position farther than the sensing region 101B, on the rear side of the vehicle 10. The sensing region 102L covers a region around the rear side of a left side surface of the vehicle 10. The sensing region 102R covers a region around the rear side of a right side surface of the vehicle 10.

A sensing result in the sensing region 102F is used for, for example, detection of a vehicle, a pedestrian, or the like existing on the front side of the vehicle 10, or the like. A sensing result in the sensing region 102B is used for, for example, a function for preventing a collision of the rear side of the vehicle 10, or the like. The sensing results in the sensing regions 102L and 102R are used for, for example, detection of an object in a blind spot on the sides of the vehicle 10, or the like.

Sensing regions 103F to 103B illustrate examples of the sensing regions by the camera 51. The sensing region 103F covers a position farther than the sensing region 102F, on the front side of the vehicle 10. The sensing region 103B covers a position farther than the sensing region 102B, on the rear side of the vehicle 10. The sensing region 103L covers a region around the left side surface of the vehicle 10. The sensing region 103R covers a region around the right side surface of the vehicle 10.

A sensing result in the sensing region 103F can be used for, for example, recognition of a traffic light or a traffic sign, a lane departure prevention assist system, and an automated headlight control system. A sensing result in the sensing region 103B can be used for, for example, parking assistance, a surround view system, or the like. Sensing results in the sensing regions 103L and 103R can be used for, for example, a surround view system.

A sensing region 104 illustrates an example of the sensing region of the LiDAR 53. The sensing region 104 covers a position farther than the sensing region 103F, on the front side of the vehicle 10. On the other hand, the sensing region 104 has a narrower range in a left-right direction than the sensing region 103F.

The sensing result in the sensing region 104 is used to detect an object such as a surrounding vehicle, for example.

A sensing region 105 illustrates an example of the sensing region of the long-distance radar 52. The sensing region 105 covers a position farther than the sensing region 104, on the front side of the vehicle 10. On the other hand, the sensing region 105 has a narrower range in the left-right direction than the sensing region 104.

A sensing result in the sensing region 105 is used, for example, for adaptive cruise control (ACC), emergency braking, collision avoidance, or the like.

Note that the respective sensing regions of the sensors: the camera 51; the radar 52; the LiDAR 53; and the ultrasonic sensor 54, included in the external recognition sensor 25 may have various configurations other than those in FIG. 2. Specifically, the ultrasonic sensor 54 may also perform sensing on the sides of the vehicle 10, or the LIDAR 53 may perform sensing on the rear side of the vehicle 10. Furthermore, an installation position of each sensor is not limited to each example described above. Furthermore, the number of sensors may be one or plural.

A correspondence between the vehicle 10 in FIG. 21 and the real-time processing device 100 in FIG. 3 is as follows. The vehicle 10 and the vehicle control system 11 correspond to the real-time processing device 100. The processor (the vehicle control ECU) 21 corresponds to the control unit 120, the real-time processing unit 121, and the safety MCU 122. The communication unit 22 corresponds to the communication unit 160. The map information accumulation unit 23 corresponds to the storage unit 170. The GNSS reception unit 24 corresponds to the first sensor 110 and a GPS 113. The external recognition sensor 25 corresponds to the first sensor 110 and the second sensor 130. The in-vehicle sensor 26 and the vehicle sensor 27 correspond to the internal sensor 140. The recording unit 28 corresponds to the storage unit 170. The travel assistance and automated driving control unit 29 corresponds to the control unit 120, the real-time processing unit 121, and the safety MCU 122. The analysis unit 61 corresponds to the control unit 120, the real-time processing unit 121, and the safety MCU 122. The self-position estimation unit 71 corresponds to the self-position estimation unit 1212 and the self-position correction unit 1213. The sensor fusion unit 72 corresponds to the control unit 120, the real-time processing unit 121, and the safety MCU 122. The recognition unit 73 corresponds to the safety MCU 122 and the object detection unit 1221. The action planning unit 62 corresponds to the safety mechanism 1222 and the route following unit 1211. The operation control unit 63 corresponds to the route following unit 1211, the safety mechanism 1222, and the accelerator and brake/steering 150. The DMS 30 corresponds to the storage unit 170. The HMI 31 corresponds to the control unit 120. The vehicle control unit 32 corresponds to the control unit 120.

2-2. Others

Of each processing described in each embodiment described above, all or a part of the processing that has been described as being automatically executed can be manually executed, or all or a part of the processing that has been described as being manually executed can be automatically executed. In addition, the processing procedure, the specific name, and information including various types of data and parameters described herein and illustrated in the drawings can be arbitrarily changed unless otherwise specified. For example, various types of information illustrated in each drawing is not limited to the information illustrated in the drawings.

Furthermore, each component of each device illustrated is functionally conceptual and is not necessarily physically configured as illustrated. That is, a specific form of distribution and integration of each device is not limited to those illustrated, and all or a part thereof can be functionally or physically distributed and integrated in an arbitrary unit according to various loads, usage conditions, and the like.

Furthermore, each embodiment and modification described above can be appropriately combined within a range in which processing contents do not contradict. Furthermore, in the embodiment described above, an automobile has been described as an example of the mobile body. However, the information processing according to the present disclosure is applicable to a mobile body other than the automobile. For example, the mobile body may be a small vehicle such as an automated bicycle or an automated three-wheels cycle, a large vehicle such as a bus or a truck, or an autonomous mobile body such as a robot or a drone.

Furthermore, the effects described herein are merely examples and are not limited, and other effects may be achieved.

3. Effects of Movement Control System According to Present Disclosure

As described above, the movement control system 1 according to the present disclosure includes the real-time processing device 100 and the non-real-time processing device (cloud server 200), and the real-time processing device 100 and the non-real-time processing device communicate with each other. The real-time processing device 100 executes the real-time processing with the constraint of guaranteeing the response time, and the non-real-time processing device executes the non-real-time processing with no constraint of guaranteeing the response time. The real-time processing device 100 may be a mobile device and may be included in the mobile device.

The non-real-time processing device executes various types of processing using the sensor information acquired from the real-time processing device 100, by the non-real-time processing. For example, the non-real-time processing device generates the route information of the traveling route of the real-time processing device 100. Then, the real-time processing device 100 performs the travel control for following the route information, by the real-time processing.

In this way, the movement control system 1 according to the present disclosure generates the route information by the non-real-time processing device and travels following the route information by the real-time processing device 100. As a result, the movement control system 1 can perform movement control with high safety that achieves both of high accuracy and high responsiveness.

Furthermore, the real-time processing device 100 detects an object on or near the traveling route of the real-time processing device 100, on the basis of the sensor information and performs emergency control including one or more of emergency braking control of the real-time processing device 100 or the re-plan instruction of the movement route to the cloud server 200. Furthermore, in a case where the real-time processing device 100 cannot communicate with the cloud server 200 and in a case where the cloud server 200 does not normally operate, the real-time processing device 100 performs the emergency control. As a result, the safety in an emergency can be further enhanced.

Furthermore, the real-time processing device 100 gives the time stamp to the sensor information and transmits the sensor information to which the time stamp is given to the cloud server 200. The cloud server 200 recognizes the position of the real-time processing device 100 and generates the route information of the real-time processing device 100, on the basis of the sensor information to which the time stamp is given. As a result, by executing the information processing at the time when the time stamp is given, accurate information processing with no temporal error can be executed.

Furthermore, the real-time processing device 100 corrects the result of the position estimation, on the basis of the position of the real-time processing device 100 recognized by the cloud server 200. Moreover, the real-time processing device 100 re-estimates the position of the real-time processing device 100 at the current time, using the corrected result of the position estimation. As a result, the real-time processing device 100 can more accurately estimate the position and more accurately travel following the route information.

Furthermore, the movement control device (real-time processing device 100 in embodiment) according to the present disclosure includes a communication unit (communication unit 160 in embodiment) that communicates with a first processing unit (non-real-time processing unit 220 or non-real-time processing unit 200A in embodiment) and a second processing unit (real-time processing unit 121 in embodiment) that controls movement of the mobile device. The communication unit receives the route information, from the first processing unit that generates the route information used to control the movement route of the mobile device using the sensor information acquired from the second processing unit on the basis of the non-real-time processing with no constraint of the response time required for the processing. The second processing unit controls the movement of the mobile device along the route information received from the first processing unit by the communication unit, on the basis of the real-time processing with the constraint of the response time required for the processing. In this way, the movement control device can perform the movement control with high safety that achieves both of high accuracy and high responsiveness, by controlling the movement on the basis of the route information generated with high accuracy on the basis of the non-real-time processing.

Furthermore, the information processing device (cloud server 200 in embodiment) according to the present disclosure includes the communication unit (communication unit 210 in embodiment) that communicates with the second processing unit (real-time processing unit 121 in embodiment) and the first processing unit (non-real-time processing unit 220 and non-real-time processing unit 200A in embodiment) that generates the route information of the mobile device. The first processing unit generates the route information used to control the movement route of the mobile device using the sensor information acquired from the second processing unit, on the basis of the non-real-time processing with no constraint of the response time required for the processing. The communication unit transmits the route information to the second processing unit. In this way, the information processing device can perform the movement control with high safety that achieves both of high accuracy and high responsiveness, by transmitting the route information generated with high accuracy on the basis of the non-real-time processing to the first processing unit that actually controls the mobile device.

4. Hardware Configuration

Figure 23:
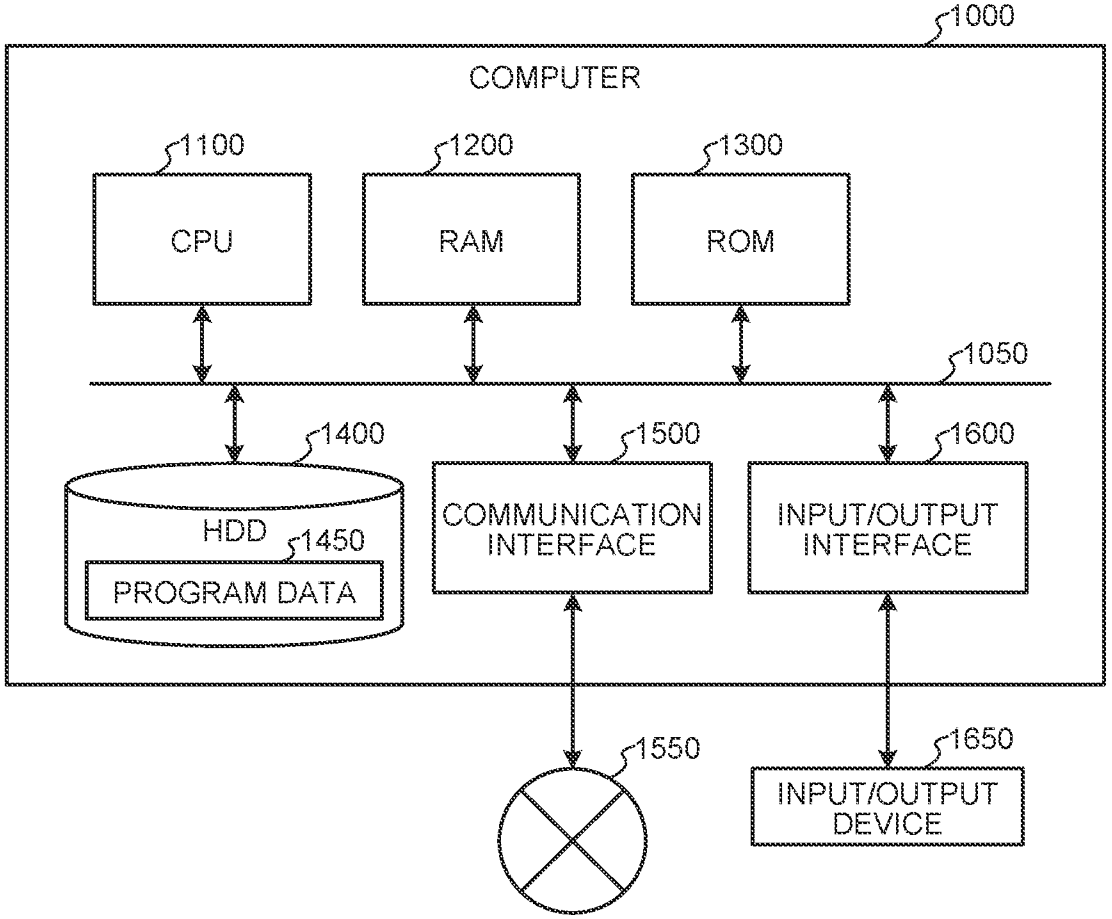
FIG. 23 is a hardware configuration diagram illustrating an example of a computer that implements functions of the movement control system according to the embodiment.

An information device such as the real-time processing device 100 according to each embodiment described above is implemented by a computer 1000 with a configuration illustrated in FIG. 23, for example. Hereinafter, the real-time processing device 100 according to the embodiment will be described as an example. FIG. 23 is a hardware configuration diagram illustrating an example of the computer 1000 that implements functions of the real-time processing device 100. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400 and controls each unit. For example, the CPU 1100 develops the program stored in the ROM 1300 or the HDD 1400 on the RAM 1200 and executes processing corresponding to various programs.

The ROM 1300 stores a boot program of a basic input output system (BIOS) or the like executed by the CPU 1100 at the time of activation of the computer 1000, a program depending on hardware of the computer 1000, or the like.

The HDD 1400 is a computer-readable recording medium that non-transiently records a program executed by the CPU 1100, data used for the program, or the like. Specifically, the HDD 1400 is a recording medium that records a movement control program according to the present disclosure that is an example of program data 1450.

The communication interface 1500 is an internet used to connect the computer 1000 to an external network 1550 (for example, the Internet). For example, the CPU 1100 receives data from other devices or transmits data generated by the CPU 1100 to the other devices, via the communication interface 1500.

The input/output interface 1600 is an interface used to connect an input/output device 1650 to the computer 1000. For example, the CPU 1100 receives data from an input device such as a keyboard or a mouse, via the input/output interface 1600. Furthermore, the CPU 1100 transmits data to an output device such as a display, a speaker, or a printer, via the input/output interface 1600. Furthermore, the input/output interface 1600 may function as a medium interface that reads a program recorded in a predetermined recording medium (media) or the like. The medium is, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, in a case where the computer 1000 functions as the real-time processing device 100 according to the embodiment, the CPU 1100 of the computer 1000 implements the functions of the control unit 120 or the like, by executing the movement control program loaded on the RAM 1200. Furthermore, the HDD 1400 stores the movement control program according to the present disclosure and data in the storage unit 170. Note that the CPU 1100 reads and executes the program data 1450 from the HDD 1400. However, as another example, these programs may be acquired from another device, via the external network 1550.

Note that the present technology can have the following configurations.

(1) A movement control system comprising:
- a first processing unit and a second processing unit configured to communicate with each other, wherein
- the first processing unit
- generates route information used to control a movement route of a mobile device using sensor information acquired from the second processing unit, on the basis of non-real-time processing with no constraint of a response time required for processing, and
- the second processing unit
- controls movement of the mobile device along the route information generated by the first processing unit, on the basis of real-time processing with a constraint of the response time required for the processing.

(2) The movement control system according to (1), wherein
- the first processing unit is included in a cloud server, and
- the second processing unit is included in the mobile device.

(3) The movement control system according to (1) or (2), wherein
- the second processing unit
- estimates a position of the mobile device on the basis of internal sensor information that is sensor information related to a behavior of the mobile device among the sensor information and controls the mobile device to travel following the movement route, on the basis of a result of the position estimation and the route information.

(4) The movement control system according to (3), wherein
- the second processing unit
- detects an object on and around a route of the movement route on the basis of the sensor information and performs one or more of emergency braking control of the mobile device or a re-plan instruction of the movement route to the first processing unit, on the basis of the behavior of the mobile device and a distance between the mobile device and the object.

(5) The movement control system according to any one of (1) to (4), wherein
- the second processing unit gives a time stamp to the sensor information, and
- the first processing unit recognizes a position of the mobile device at a time of the time stamp, on the basis of the sensor information to which the time stamp is given.

(6) The movement control system according to (5), wherein
- the second processing unit
- corrects a result of position estimation at the time of the time stamp, on the basis of the position of the mobile device recognized by the first processing unit and re-estimates a position of the mobile device at a current time, using the corrected result of the position estimation.

(7) The movement control system according to (6), wherein
- the second processing unit
- controls movement of the mobile device along the route information, on the basis of the re-estimated position of the mobile device at the current time.

(8) The movement control system according to any one of (1) to (7), wherein
- the first processing unit
- performs object recognition including at least one or more of lighting color recognition of a traffic light, road sign recognition, white line recognition, moving object recognition, and action prediction of a moving object, on the basis of the sensor information.

(9) The movement control system according to (8), wherein the first processing unit generates the route information, on the basis of a result of the position recognition and a result of the object recognition.

(10) The movement control system according to any one of (1) to (9), wherein the first processing unit generates a second movement route connected to the movement route, while the mobile device is traveling on the movement route.

(11) The movement control system according to (10), wherein the second processing unit, in a case where the generation of the second movement route by the first processing unit is delayed, controls the mobile device to stop on or near the movement route.

(12) The movement control system according to (1) or any one of (3) to (11), wherein the first processing unit and the second processing unit are included in the mobile device.

(13) A movement control method performed by a first processing unit and a second processing unit that communicate with each other, the method comprising:

generating route information used to control a movement route of a mobile device using sensor information acquired from the second processing unit, on the basis of non-real-time processing with no constraint of a response time required for processing, by the first processing unit; and controlling movement of the mobile device along the route information generated by the first processing unit, on the basis of real-time processing with a constraint of the response time required for the processing, by the second processing unit.

(14) A movement control device comprising:

a communication unit configured to communicate with a first processing unit; and a second processing unit configured to control movement of a mobile device, wherein the communication unit receives route information from the first processing unit that generates the route information used to control a movement route of the mobile device using sensor information acquired from the second processing unit on the basis of non-real-time processing with no constraint of a response time required for processing, and the second processing unit controls movement of the mobile device along the route information received from the first processing unit by the communication unit, on the basis of real-time processing with a constraint of the response time required for the processing.

(15) An information processing device comprising:

a communication unit configured to communicate with a second processing unit; and a first processing unit configured to generate route information of a mobile device, wherein the first processing unit generates route information used to control a movement route of the mobile device using sensor information acquired from the second processing unit, on the basis of non-real-time processing with no constraint of a response time required for processing, and the communication unit transmits the route information to the second processing unit.

REFERENCE SIGNS LIST

1 MOVEMENT CONTROL SYSTEM
100 REAL-TIME PROCESSING DEVICE
110 FIRST SENSOR
120 CONTROL UNIT
130 SECOND SENSOR
140 INTERNAL SENSOR
150 ACCELERATOR AND BRAKE/STEERING
160 COMMUNICATION UNIT
170 STORAGE UNIT
200 CLOUD SERVER
210 COMMUNICATION UNIT
220 NON-REAL-TIME PROCESSING UNIT
230 STORAGE UNIT

The invention claimed is:

1. A movement control system, comprising:

a first central processing unit (CPU); and a second central processing unit (CPU), wherein the second CPU is configured to:

receive sensor information from a plurality of sensors, wherein the sensor information is associated with a mobile device, the mobile device includes the plurality of sensors, and the sensor information includes internal sensor information;

estimate a first position of the mobile device based on the internal sensor information, wherein the first position is associated with an accumulation of a plurality of error values, and the plurality of error values is associated with a plurality of past positions of the mobile device; and allocate a time stamp to the sensor information, the first CPU is configured to:

receive, from the second CPU, the sensor information based on the allocation of the time stamp to the sensor information;

determine, at a specific time, an absolute position of the mobile device based on the sensor information, wherein the specific time corresponds to the allocated time stamp; and generate route information based on the sensor information, and the second CPU is further configured to:

determine a second position of the mobile device based on each of the first position of the mobile device, the absolute position of the mobile device, and the plurality of error values; and control a movement of the mobile device on a first movement route based on each of the route information and the second position of the mobile device.

2. The movement control system according to claim 1, wherein the first CPU is in a cloud server, and the mobile device includes the second CPU.

3. The movement control system according to claim 1, wherein the second CPU is further configured to:

detect, based on the sensor information, at least one of an object on the first movement route or the object at a specific distance from the first movement route; and control, based on the internal sensor information and a distance between the object and the mobile device, at least one of an execution of an emergency braking control of the mobile device or a transmission of a re-plan instruction of the first movement route to the first CPU.

4. The movement control system according to claim 1, wherein the second CPU is further configured to re-estimate the first position of the mobile device at a current time based on the absolute position of the mobile device.

5. The movement control system according to claim 4, wherein the second CPU is further configured to control the movement of the mobile device based on each of the route information and the re-estimated first position of the mobile device at the current time.

6. The movement control system according to claim 1, wherein the first CPU is further configured to perform an object recognition process based on the sensor information, and the object recognition process includes at least one of a lighting color recognition of a traffic light, a road sign recognition, a white line recognition, a moving object recognition, or an action prediction of a moving object.

7. The movement control system according to claim 6, wherein the first CPU is further configured to generate the route information based on the determined second position of the mobile device and the object recognition process.

8. The movement control system according to claim 7, wherein the first CPU is further configured to generate, at a time the mobile device is on the first movement route, a second movement route that is connected to the first movement route.

9. The movement control system according to claim 8, wherein the second CPU is further configured to control, based on a delay in the generation of the second movement route, the mobile device to one of stop on the first movement route or stop at a specific distance from the first movement route.

10. The movement control system according to claim 1, wherein the mobile device includes each of the first CPU and the second CPU.

11. A movement control method, comprising:

in a movement control system receiving sensor information from a plurality of sensors, wherein the sensor information is associated with a mobile device, the mobile device includes the plurality of sensors, and the sensor information includes internal sensor information;

estimating a first position of the mobile device based on the internal sensor information, wherein the first position is associated with an accumulation of a plurality of error values, and the plurality of error values is associated with a plurality of past positions of the mobile device;

allocating a time stamp to the sensor information;

determining at a specific time, an absolute position of the mobile device based on the sensor information, wherein the specific time corresponds to the allocated time stamp;

generating route information based on the sensor information;

determining a second position of the mobile device based on each of the first position of the mobile device, the absolute position of the mobile device, and the plurality of error values; and controlling a movement of the mobile device on a movement route based on each of the route information and the second position of the mobile device.

12. A movement control device, comprising:

a communication terminal configured to communicate with a first central processing unit (CPU); and a second central processing unit (CPU) configured to:

receive sensor information from a plurality of sensors, wherein the sensor information is associated with a mobile device, the mobile device includes the plurality of sensors, and the sensor information includes internal sensor information;

estimate a first position of the mobile device based on the internal sensor information, wherein the first position is associated with an accumulation of a plurality of error values, and the plurality of error values is associated with a plurality of past positions of the mobile device; and allocate a time stamp to the sensor information, wherein the first CPU receives, from the second CPU, the sensor information based on the allocation of the time stamp to the sensor information, determines, at a specific time, an absolute position of the mobile device based on the sensor information, wherein the specific time corresponds to the allocated time stamp, and generates route information based on the sensor information, the communication terminal is further configured to receive the route information from the first CPU, and the second CPU is further configured to:

determine a second position of the mobile device based on each of the first position of the mobile device, the absolute position of the mobile device, and the plurality of error values; and control a movement of the mobile device on a movement route based on each of the route information and the second position of the mobile device.

* * * * *